(12) United States Patent
Kraft et al.

(10) Patent No.: US 11,846,438 B2
(45) Date of Patent: *Dec. 19, 2023

(54) MIGRATION OF SETTINGS FROM A NON-CONNECTED BUILDING CONTROLLER TO ANOTHER BUILDING CONTROLLER

(71) Applicant: Ademco Inc., Golden Valley, MN (US)

(72) Inventors: Nathaniel D. Kraft, Minnetonka, MN (US); Bernard T. Geary, Fairlawn, OH (US); Ajay Pai, Maple Grove, MN (US); Michael Albright, Minneapolis, MN (US); Sharath Venkatesha, Minnetonka, MN (US); Jeffrey Boll, Brooklyn Park, MN (US)

(73) Assignee: Ademco Inc., Golden Valley, MN (US)

( * ) Notice: Subject to any disclaimer, the term of this patent is extended or adjusted under 35 U.S.C. 154(b) by 144 days.

This patent is subject to a terminal disclaimer.

(21) Appl. No.: 17/507,865

(22) Filed: Oct. 22, 2021

(65) Prior Publication Data

US 2022/0042697 A1    Feb. 10, 2022

Related U.S. Application Data

(63) Continuation of application No. 15/217,808, filed on Jul. 22, 2016, now Pat. No. 11,156,375.

(51) Int. Cl.
*F24F 11/30* (2018.01)
*G05B 19/409* (2006.01)
(Continued)

(52) U.S. Cl.
CPC ............ *F24F 11/30* (2018.01); *G05B 19/409* (2013.01); *G06K 7/1417* (2013.01);
(Continued)

(58) Field of Classification Search
CPC ........ G06F 16/248; G06F 16/26; G06F 21/84; G06F 3/04847; F24F 11/30; F24F 11/49;
(Continued)

(56) References Cited

U.S. PATENT DOCUMENTS

| 6,851,621 B1 | 2/2005 | Wacker et al. |
| 7,055,759 B2 | 6/2006 | Wacker et al. |

(Continued)

FOREIGN PATENT DOCUMENTS

| CN | 103858385 | 6/2014 |
| CN | 105144635 | 12/2015 |

(Continued)

OTHER PUBLICATIONS

Response to Examination Report dated Oct. 1, 2021, from counterpart European Application No. 17746607.5 filed Feb. 8, 2022, 11 pp.

(Continued)

*Primary Examiner* — Darrin D Dunn
(74) *Attorney, Agent, or Firm* — Greenberg Traurig, LLP; Ryan D. Sharp; David J. Dykeman

(57) ABSTRACT

A Heating, Ventilation, and/or Air Conditioning (HVAC) controller configured to control at least part of an HVAC system of a building. The HVAC controller may include a user interface and a controller. In response to a selection by a user at the user interface, the controller may assemble and present via the user interface an output that encodes settings in a machine readable form. The controller may display the encoded settings on the display with fixed segments of a fixed segment display. An application program code on a remote device may be utilized to capture the displayed fixed segments that encode the settings in an image. The captured (Continued)

image of fixed segments may be decoded at the remote device or may be sent to a remote computing device for processing and/or decoding.

16 Claims, 24 Drawing Sheets

(51) Int. Cl.
  *H04L 12/28* (2006.01)
  *H04L 41/084* (2022.01)
  *G06V 30/224* (2022.01)
  *G06K 7/14* (2006.01)
  *H04N 7/18* (2006.01)
  *F24F 120/20* (2018.01)

(52) U.S. Cl.
  CPC ........ *G06V 30/224* (2022.01); *H04L 12/2807* (2013.01); *H04L 41/0846* (2013.01); *H04N 7/185* (2013.01); *F24F 2120/20* (2018.01); *G05B 2219/2614* (2013.01); *H04L 2012/2841* (2013.01)

(58) Field of Classification Search
  CPC .......... F24F 11/63; G05B 19/409; G05B 2219/2614; G06K 7/1417; G06V 30/224; G06V 20/53; G06V 10/25; H04N 2201/0081; G06T 7/80; G06T 2200/24
  See application file for complete search history.

(56) References Cited

U.S. PATENT DOCUMENTS

| | | |
|---|---|---|
| 7,222,800 B2 | 5/2007 | Wruck |
| 7,565,813 B2 | 7/2009 | Pouchak |
| 8,155,455 B2 | 4/2012 | Huang et al. |
| 8,805,000 B2 | 8/2014 | Derby et al. |
| 8,868,219 B2 | 10/2014 | Fadell et al. |
| 8,913,058 B2 | 12/2014 | Liu |
| 8,929,877 B2 | 1/2015 | Rhoads et al. |
| 8,988,318 B2 | 3/2015 | Chupp |
| 9,002,525 B2 | 4/2015 | Gourlay et al. |
| 9,038,897 B2 | 5/2015 | Jayaprakash et al. |
| 9,215,281 B2 | 12/2015 | Iggulden et al. |
| 9,256,230 B2 | 2/2016 | Matsuoka et al. |
| 9,271,141 B1 | 2/2016 | Egeler et al. |
| 9,273,878 B2 | 3/2016 | Kucera |
| 9,332,040 B2 | 5/2016 | Logue et al. |
| 9,438,818 B2 | 9/2016 | Wang et al. |
| 9,679,310 B1 | 6/2017 | Saltzstein et al. |
| 9,722,813 B2 | 8/2017 | Benes et al. |
| 10,253,999 B2 | 4/2019 | Leen et al. |
| 10,505,751 B2 | 12/2019 | Casilli |
| 2001/0034754 A1 | 10/2001 | Elwahab et al. |
| 2003/0050737 A1* | 3/2003 | Osann, Jr. ............. H04L 67/125 700/277 |
| 2005/0237203 A1 | 10/2005 | Burman et al. |
| 2006/0109226 A1 | 5/2006 | Tyrrell et al. |
| 2006/0261167 A1 | 11/2006 | Ray et al. |
| 2008/0250122 A1 | 10/2008 | Zsigmond et al. |
| 2009/0158188 A1 | 6/2009 | Bray et al. |
| 2009/0212113 A1* | 8/2009 | Chiu ................... G06K 7/1417 235/462.41 |
| 2009/0322884 A1 | 12/2009 | Bolick et al. |
| 2009/0326684 A1 | 12/2009 | Wang et al. |
| 2010/0014780 A1 | 1/2010 | Kalayeh |
| 2010/0020970 A1 | 1/2010 | Liu et al. |
| 2010/0138764 A1 | 6/2010 | Tatambeiki et al. |
| 2010/0140364 A1 | 6/2010 | Nordberg et al. |
| 2010/0277768 A1 | 11/2010 | Silverbrook et al. |
| 2010/0317332 A1 | 12/2010 | Bathiche et al. |
| 2012/0044358 A1 | 2/2012 | Thomason et al. |
| 2012/0278670 A1 | 11/2012 | Shimamoto et al. |
| 2013/0028608 A1 | 1/2013 | Chupp |
| 2013/0087608 A1 | 4/2013 | Addy et al. |
| 2013/0222672 A1 | 8/2013 | Kim et al. |
| 2013/0256407 A1 | 10/2013 | Su et al. |
| 2013/0299570 A1 | 11/2013 | Ting et al. |
| 2014/0001253 A1 | 1/2014 | Smith |
| 2014/0170969 A1 | 6/2014 | DeVos |
| 2014/0214596 A1 | 7/2014 | Acker, Jr. et al. |
| 2014/0253301 A1 | 9/2014 | Hirayama et al. |
| 2014/0308045 A1 | 10/2014 | Pederson |
| 2015/0120000 A1 | 4/2015 | Coffey et al. |
| 2015/0185742 A1 | 7/2015 | Morita |
| 2015/0229488 A1 | 8/2015 | Averitt |
| 2015/0369505 A1 | 12/2015 | Malve et al. |
| 2016/0040903 A1 | 2/2016 | Emmons et al. |
| 2016/0086045 A1* | 3/2016 | Roberts ................. G05B 15/02 382/183 |
| 2016/0154413 A1 | 6/2016 | Trivedi et al. |
| 2016/0178225 A1 | 6/2016 | Vallikannu et al. |
| 2016/0218884 A1 | 7/2016 | Ebrom et al. |
| 2016/0234036 A1 | 8/2016 | Hatambeiki et al. |
| 2017/0048901 A1 | 2/2017 | Finch et al. |
| 2017/0075328 A1 | 3/2017 | Zhang et al. |
| 2017/0105129 A1 | 4/2017 | Teplin et al. |
| 2017/0364106 A1 | 12/2017 | Smith et al. |
| 2018/0023837 A1 | 1/2018 | Kraft et al. |
| 2018/0031256 A1 | 2/2018 | Gillette et al. |
| 2018/0031260 A1 | 2/2018 | Bernbom et al. |
| 2018/0300923 A1 | 10/2018 | Kaplan |
| 2019/0094820 A1 | 3/2019 | Ray et al. |

FOREIGN PATENT DOCUMENTS

| | | |
|---|---|---|
| WO | 2014036272 A1 | 3/2014 |
| WO | 2016106227 A1 | 6/2016 |

OTHER PUBLICATIONS

Response to Communication Pursuant to Rules 161(1) of the EPC dated Jan. 22, 2019, from counterpart European Application No. 17746607.5, 15 pp.
Examination Report from counterpart European Application No. 1774607.5, dated Mar. 20, 2020, 7 pp.
International Search Report and Written Opinion for PCT Application No. PCT/US2017/043310, dated Oct. 2, 2017.
First Office Action and Search Report, and translation thereof, from counterpart Chinese Application No. 201780058529.0, dated Jan. 5, 2021, 9 pp.
Response to Examination Report from counterpart European Application No. 1774607.5, dated Mar. 20, 2020, filed Sep. 10, 2020, 11 pp.
Notice of Intent to Grant from counterpart Chinese Application No. 201780058529.0, dated Aug. 11, 2021, 2 pp.
Prosecution History from U.S. Appl. No. 15/217,808, dated Mar. 8, 2018 through Jun. 24, 2021, 160 pp.
Examination Report from counterpart European Application No. 1774607.5, dated Jan. 10, 2021, 7 pp.

* cited by examiner

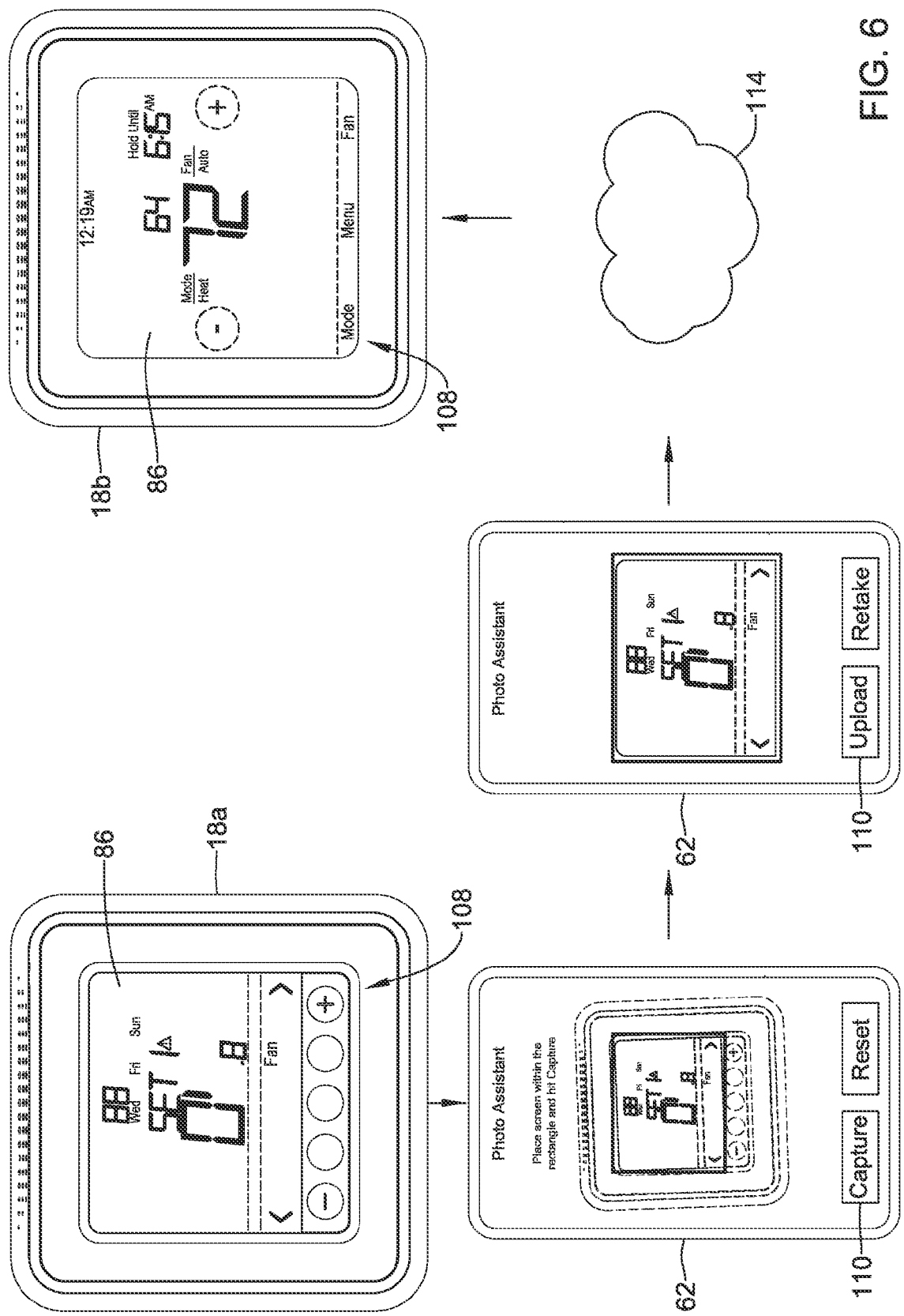

MIGRATION OF SETTINGS FROM A NON-CONNECTED BUILDING CONTROLLER TO ANOTHER BUILDING CONTROLLER

This application is a continuation of U.S. patent application Ser. No. 15/217,808, filed 22 Jul. 2016, the entire contents of which is incorporated herein by reference.

TECHNICAL FIELD

The present disclosure pertains to building control systems such as Heating, Ventilation, and/or Air Conditioning (HVAC) systems, security systems, lighting systems and the like. More particularly, the present disclosure pertains to transferring settings and/or data from a non-connected building controller to another building controller.

BACKGROUND

Building control systems are used to control conditions within a building or other structure. Example building control systems include HVAC systems, security systems, and lighting systems. HVAC systems, for example, are often used to control the comfort level within a building or other structure. HVAC systems typically include an HVAC controller that controls various HVAC components of the HVAC system in order to affect and/or control one or more environmental conditions within the building. In many cases, an HVAC controller provides control signals to various HVAC components of the HVAC system, sometimes via a number of control wires that extend through the wall. Some HVAC controller have a wired or wireless connection to a network, while other HVAC controllers are non-connected and do not have a wired or wireless connection to a network. Improvements in the hardware, user experience, and functionality of such HVAC controllers would be desirable.

SUMMARY

The present disclosure relates generally to building control systems, and more specifically, to transferring of settings and/or data from a non-connected building controller to another building controller.

In a particular example of the present disclosure, an HVAC controller may be configured to control at least part of an HVAC system of a building, where the HVAC controller may reference settings that may be customizable by a user for a particular installation. While an HVAC controller is used here as an example, it is contemplated that the present disclosure can be applied to any suitable building controller, as desired. The illustrative HVAC controller may include a user interface and a controller operably coupled to the user interface. The controller may be configured to at least partially control the HVAC system of the building based, at least in part, on settings customizable by a user. In some cases, in response to a selection by a user via the user interface, the controller may be configured to assemble and present via the user interface an output that encodes two or more of the settings and/or other data in a machine readable form.

In another example of the present disclosure, a computer readable medium may be provided that may include a program code stored thereon in a non-transitory state. The program code may be used by a computing device connectable to a network, where the program code may cause the computing device to execute a method for obtaining settings from a non-network connected building controller. The method may include receiving a request from a user for obtaining settings from a building control device. In some cases, in response to receiving the request, the program code may initiate a camera operation of a camera in communication with the computing device to capture an image of an output displayed by the building control device. The output displayed by the building control device may provide two or more of the settings encoded in a machine readable form, which may or may not be in a human readable form. The method in the program code may further include capturing an image of the output displayed by the building control device with the camera. In some cases, the image and/or the two or more of the settings may be transmitted from the computing device to a remote device via a network.

In some examples, a method may allow for exporting settings of a non-network connected HVAC controller. The method may include assembling and/or displaying via a user interface of the HVAC controller an output that provides two or more of the settings of the HVAC controller encoded in a machine readable form. In this example method, an image of the output displayed by the HVAC controller may be captured. In some cases, the captured image may be processed to decode the two or more of the settings of the HVAC controller to produce the two or more settings encoded in the output. These settings may then be transferred to another HVAC controller, such as when the non-connected HVAC controller is being replaced or upgraded with another HVAC controller.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIG. 6 is a schematic flow diagram of an illustrative method for transferring settings and/or data from a first HVAC controller to a second HVAC controller;

Figure 1:
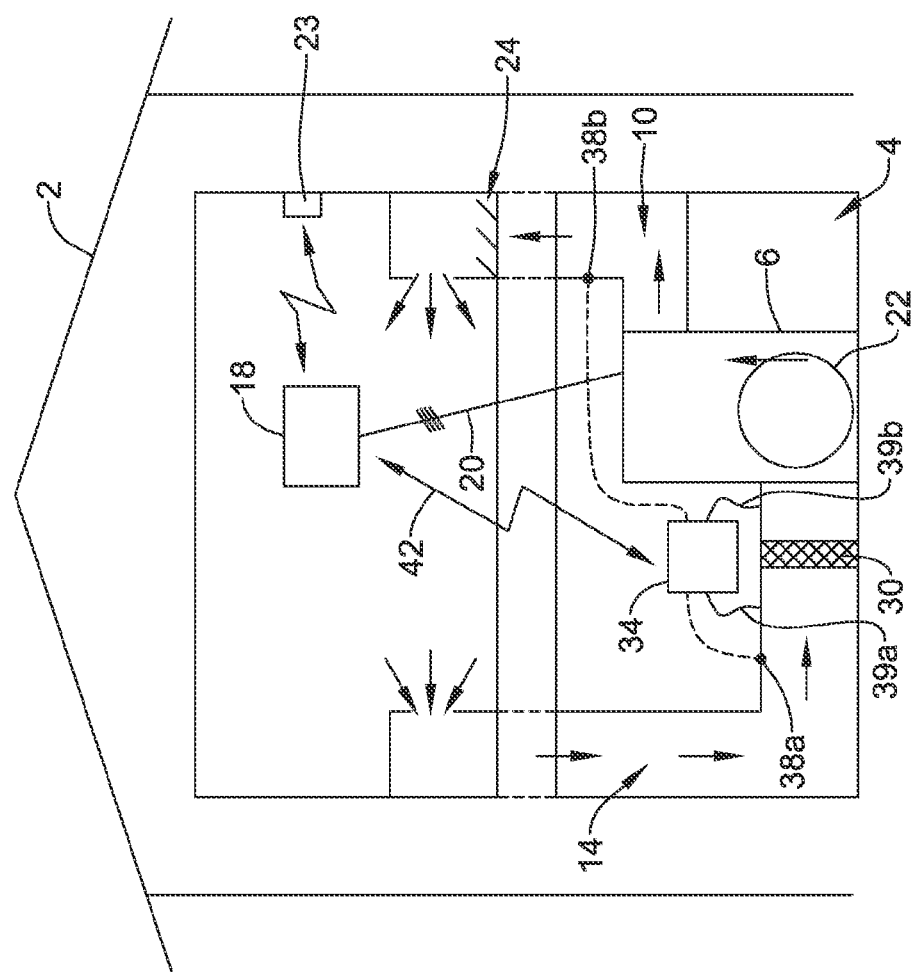
FIG. 1 is a schematic view of an illustrative HVAC system servicing a building or other structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and other systems. While HVAC systems with HVAC controllers are used as an example below, it should be recognized that the concepts disclosed herein can be applied to building automation systems more generally.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to one or more temperature sensor(s) for sensing ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 23 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components 6 to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may, in addition to controlling the HVAC components 6 under the direction of the thermostat, be configured to measure or detect a change in a given parameter between the return air side and the discharge air side of the HVAC system 4. For example, the equipment interface module 34 may measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature−return air temperature)

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In some instances, the equipment interface module 34 may communicate, relay or otherwise transmit data regarding the selected parameter (e.g. temperature, pressure, flow rate, etc) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
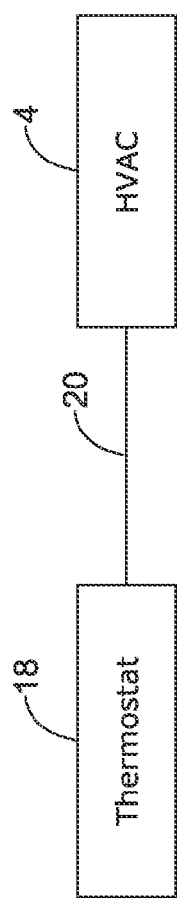
FIG. 2 is a schematic view of an illustrative HVAC controller that may facilitate access and/or control of the HVAC system of FIG. 1.

FIG. 2 is a schematic view of an illustrative HVAC controller 18 (e.g., a thermostat) that may facilitate accessing and/or controlling the HVAC system 4 of FIG. 1. As discussed above, the HVAC controller 18 may communicate with the one or more HVAC components 6 of the HVAC system 4 via a wired or wireless link 20. The HVAC controller 18 in FIG. 2 may be a connected HVAC controller 18 that is connectable to a network, or may be an non-connected HVAC controller 18 that may not be capable of connecting to a network (other than the wired or wireless link 20 to one or more HVAC components 6 of the HVAC system 4).

Figure 3:
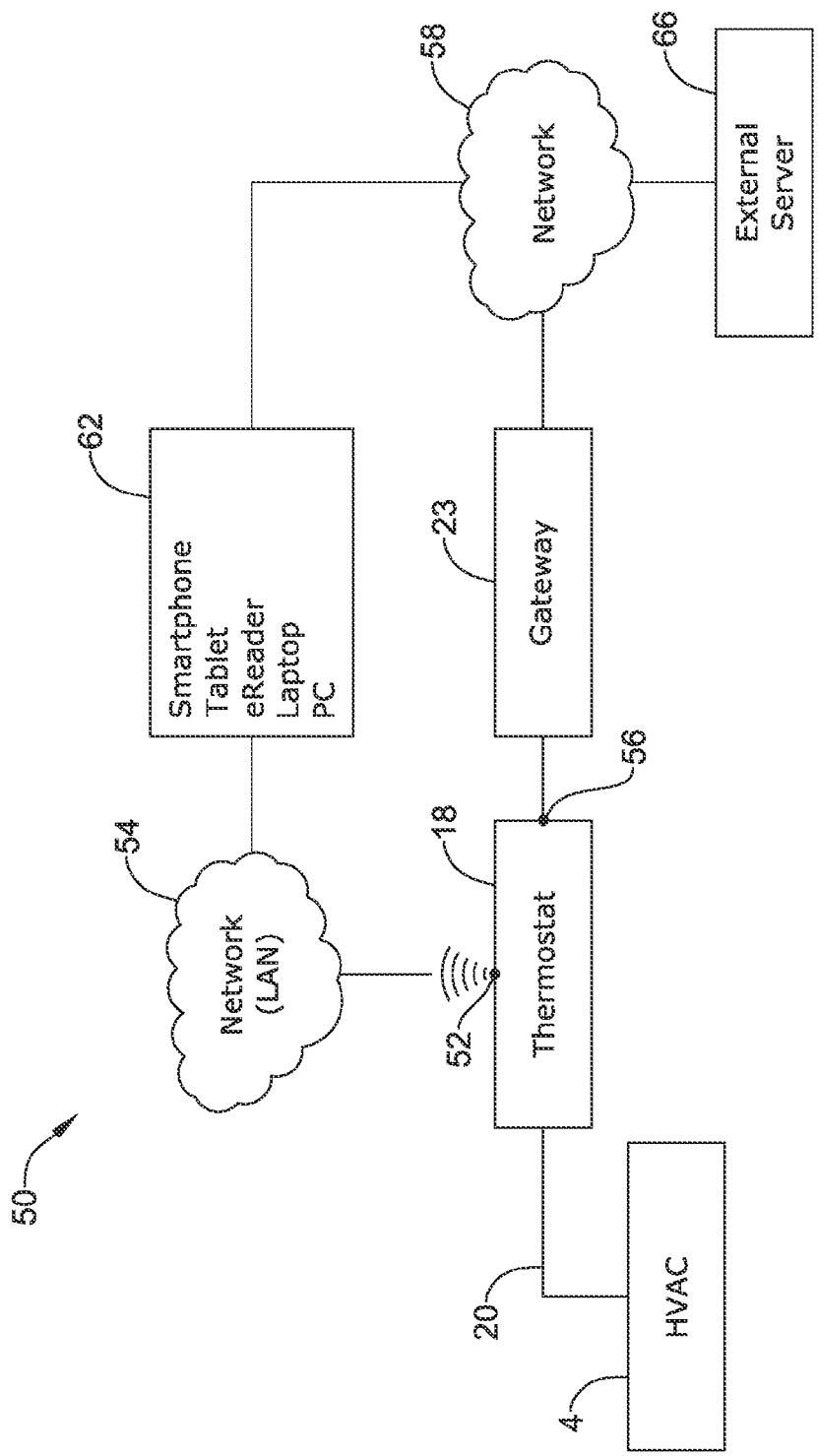
FIG. 3 is a schematic view of an illustrative HVAC control system that may facilitate access and/or control of the HVAC system of FIG. 1.

FIG. 3 is a schematic view of an illustrative HVAC control system 50 that may facilitate remote access and/or control of the illustrative HVAC system 4 shown in FIG. 1. The HVAC control system 50 may be considered a building automation system or part of a building automation system. The illustrative HVAC control system 50 may include an HVAC controller, as for example HVAC controller 18 (see FIG. 1 or 2), that is configured to communicate with and control one or more HVAC components 6 of the HVAC system 4. As discussed above, the HVAC controller 18 may communicate with the one or more HVAC components 6 of the HVAC system 4 via a wired or wireless link 20. Additionally, the HVAC controller 18 may communicate over one or more wired or wireless networks that may accommodate remote access and/or control of the HVAC controller 18 via another device such as a smart phone, tablet, e-reader, laptop computer, personal computer, key fob, or the like. As shown in FIG. 3, the HVAC controller 18 may include a first communications port 52 for communicating over a first network 54, and in some cases, a second communications port 56 for communicating over a second network 58. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

In some cases, the HVAC controller 18 may be programmed to communicate over the second network 58 with an external web service hosted by one or more external web server(s) 66. A non-limiting example of such an external web service is Honeywell's TOTAL CONNECT COMFORT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services sometimes including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like from the web server 66 over the second network 58. In some instances, the HVAC controller 18 may be configured to receive one or more user profiles having at least one operational parameter setting that is selected by and reflective of a user's preferences. In still other instances, the HVAC controller 18 may be configured to receive and/or download firmware and/or hardware updates such as, for example, device drivers from the web server 66 over the second network 58. Additionally, the HVAC controller 18 may be configured to receive local weather data, weather alerts and/or warnings, major stock index ticker data, traffic data, and/or news headlines over the second network 58. These are just some examples.

Depending upon the application and/or where the HVAC user is located, remote access and/or control of the HVAC controller 18 may be provided over the first network 54 and/or the second network 58. A variety of remote wireless devices 62 may be used to access and/or control the HVAC controller 18 from a remote location (e.g. remote from the HVAC Controller 18) over the first network 54 and/or second network 58 including, but not limited to, mobile phones including smart phones, tablet computers, laptop or personal computers, wireless network-enabled key fobs, e-readers, and/or the like. In many cases, the remote wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, an application program code (i.e. app) stored in the memory of the remote device 62 may be used to remotely access and/or control the HVAC controller 18. The application program code (app) may be downloaded from an external web service, such as the web service hosted by the external web server 66 (e.g. Honeywell's TOTAL CONNECT COMFORT™ web service) or another external web service (e.g. ITUNES® or Google Play). In some cases, the app may provide a remote user interface for interacting with the HVAC controller 18 at the user's remote device 62. For example, through the user interface provided by the app, a user may be able to change operating parameter settings such as, for example, temperature set points, humidity set points, start times, end times, schedules, window frost protection settings, accept software updates, take pictures of thermostat screens, encode/decode data, transfer data to/from thermostats, and/or the like. Communications may be routed from the user's remote device 62 to the web server 66 and then, from the web server 66 to the HVAC controller 18 connected to the second network. In some cases, communications may flow in the opposite direction such as, for example, when a user interacts directly with the HVAC controller 18 to change an operating parameter setting such as, for example, a schedule change or a set point change. The change made at the HVAC controller 18 may be routed to the web server 66 and then from the web server 66 to the remote device 62 where it may be reflected by the application program executed by the remote device 62.

In some cases, a user may be able to interact with the HVAC controller 18 via a user interface provided by one or more web pages served up by the web server 66. The user may interact with the one or more web pages using a variety of internet capable devices to effect a setting or other change at the HVAC controller 18, and in some cases view usage data and energy consumption data related to the usage of the HVAC system 4. In some cases, communication may occur between the user's remote device 62 and the HVAC controller 18 without being relayed through a server such as external server 66, for example, through a camera, a listening device, a data link, etc. These are just some examples.

Figure 4:
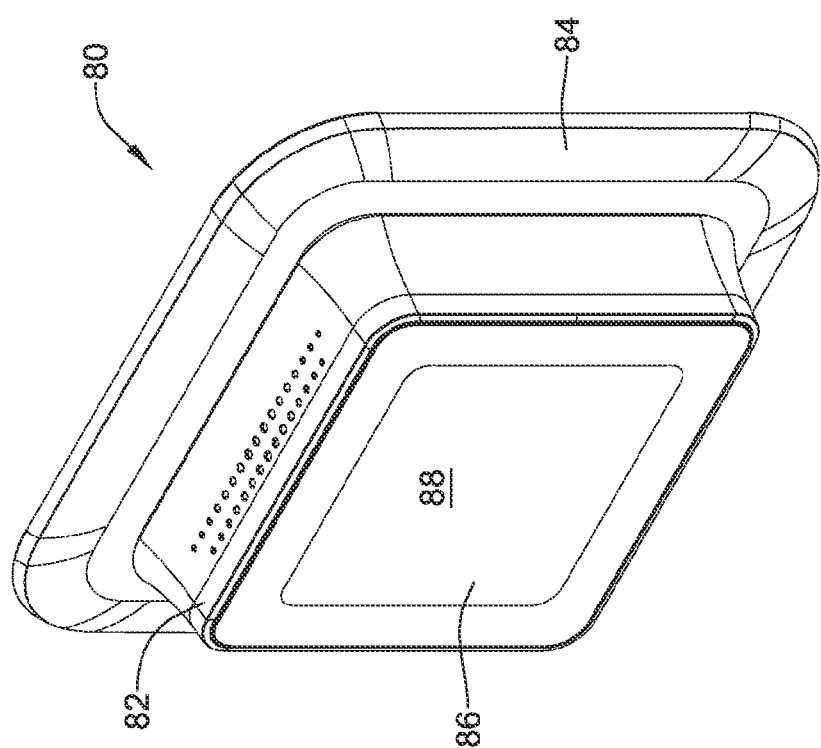
FIG. 4 is a perspective view of an illustrative HVAC controller that may be used in an HVAC control system.

FIG. 4 is a perspective view of an illustrative thermostat assembly 80. In some instances, the thermostat assembly 80 may be considered as an example of the HVAC controller 18 referenced in FIGS. 1 and 2. In some instances, and with particular reference to FIG. 4, the thermostat assembly 80 may include a thermostat 82 having a display 86 with a touch sensitive screen 88, and a wall mountable connector 84. As will be illustrated, the wall mountable connector 84 may be configured to accommodate field wires that enter from a rear of the wall mountable connector 84. When so provided, the wall mountable connector 84 may provide an electrical connection between terminals (not shown) of the thermostat 82 and field wires (not illustrated) of the HVAC system 4 (FIGS. 1 and 2).

In the example shown, the wall mountable connector 84 may also provide a mechanical connection to the thermostat 82 and thus may be used to secure the thermostat 82 in place relative to a vertical surface such as a wall. In some cases, the wall mountable connector 84 may provide electrical and mechanical connections to the thermostat 82 in a compact design, and may be configured to accommodate a variety of different thermostats models. An example of different thermostats that may be accommodated by the wall mountable connector 84 may include a non-connected thermostat that is not configured to connect to a network such as network 56 or network 58, and a connected thermostat that is configured to be connect to a network such as network 56 or network 58.

Figure 5:
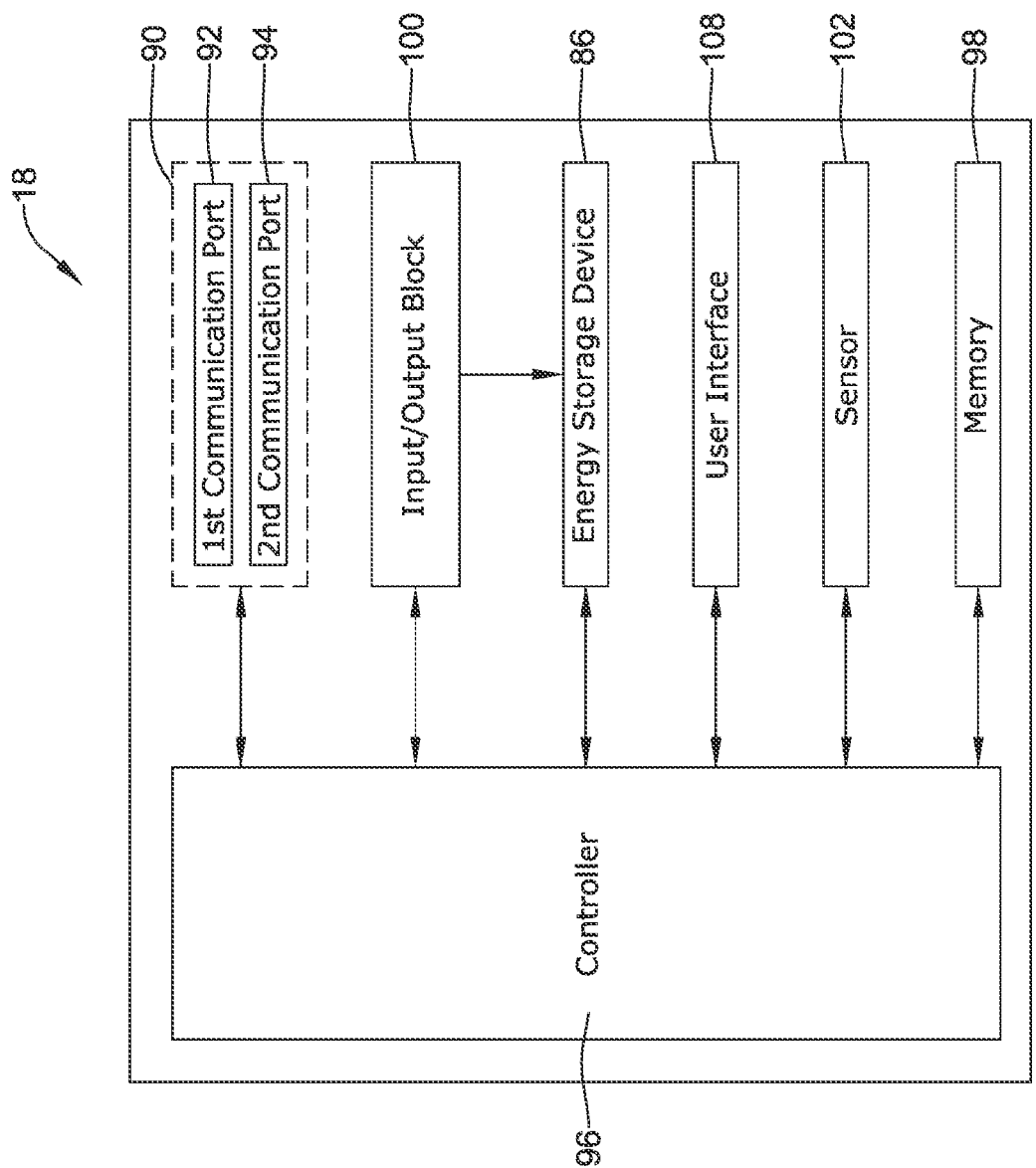
FIG. 5 is schematic block diagram showing some illustrative components of the HVAC controller assembly of FIG. 4.

FIG. 5 is a schematic block diagram of an illustrative HVAC controller 18. As discussed above with reference to FIG. 2, the HVAC controller 18 may be a non-connected HVAC controller that can only connect to and control HVAC components but cannot connect to a network such as network 56 or network 58. Alternatively as discussed above with respect to FIG. 3, the HVAC controller 18 may be a connected HVAC controller that can connect to a network such as network 56 or network 58 through which the HVAC controller may be accessed and/or controlled from a remote location over the first network 54 and/or the second network 58 using a remote wireless device 62 such as, for example, a smart phone, a tablet computer, a laptop or personal computer, a wireless network-enabled key fob, an e-reader, and/or the like. In some instances, the HVAC controller 18 may be a thermostat, but this is not required in all instances.

When the HVAC controller 18 is connected HVAC controller, the HVAC controller 18 may include a communications block 90 having a first communications port 92 for communicating over a first network (e.g. wireless LAN) and/or a second communications port 94 for communicating over a second network (e.g. WAN or the Internet). When the HVAC controller 18 is a non-connected HVAC controller, the HVAC controller 18 may not include the communications block 90.

The first communications port 92, when provided, may be a wireless communications port including a wireless transceiver for wirelessly sending and/or receiving signals over a first wireless network 54. Similarly, the second communications port 94 may be a wireless communications port including a wireless transceiver for sending and/or receiving signals over a second wireless network 58. In some cases, the second communications port 94 may be in communication with a wired or wireless router or gateway for connecting to the second network, but this is not required. In some cases, the router or gateway may be integral to the HVAC controller 18 or may be provided as a separate device.

Additionally, the illustrative HVAC controller 18 may include a processor or controller (e.g. microprocessor, microcontroller, etc.) 96 and a memory 98 operatively coupled to the processor or controller 96. The HVAC controller 18 may also include a user interface 108 operatively coupled to the processor or controller 96, but this is not required, where the user interface 108 may include the display 86 and/or a touch sensitive screen 88. In some cases, HVAC controller 18 may include a timer (not shown). The timer may be integral to the processor 64 or may be provided as a separate component.

The memory 98 of the illustrative HVAC controller 18 may be in communication with the processor or controller 96. The memory 98 may be used to store any desired information, such as the aforementioned control algorithm, set points, schedule times, diagnostic limits such as, for example, differential pressure limits, delta T limits, configuration settings such as, for example, cycles per hour, number of heating stages, number of cooling stages, humidifier present, and the like. The memory 98 may be any suitable type of storage device including, but not limited to, RAM, ROM, EPROM, flash memory, a hard drive, and/or the like. In some cases, the processor 96 may store information within the memory 98, and may subsequently retrieve the stored information from the memory 98.

In many cases, the HVAC controller 18 may include an input/output block (I/O block) 100 for providing one or more control signals to the HVAC system 4. For example, the I/O block 100 may communicate with one or more HVAC components 6 of the HVAC system 4. The HVAC controller 18 may have any number of wire terminals for receiving control wires for one or more HVAC components 6 of the HVAC system 4. Different HVAC systems 4 may have different HVAC components and/or type of HVAC components 6, which may result in different wiring configurations. In some cases, the I/O block 100 may communicate with another controller, which is in communication with one or more HVAC components 6 of the HVAC system 4, such as a zone control panel in a zoned HVAC system, equipment interface module (EIM) (e.g. EIM 34 shown in FIG. 1) or any other suitable building control device.

The HVAC controller 18 may also include one or more sensors 102 such as for example, a temperature sensor, a humidity sensor, an occupancy sensor, a proximity sensor, and/or the like. In some cases, the sensor(s) 102 of the HVAC controller 18 may include an internal temperature sensor, but this is not required. Alternatively, or in addition, the HVAC controller 18 may communicate with one or more remote temperature sensors, humidity sensors, occupancy sensors, and/or other sensors located throughout the building or structure. Additionally, the HVAC controller may communicate with a temperature sensor, humidity sensor, and/or other sensors located outside of the building or structure for sensing an outdoor temperature and/or humidity if desired.

The user interface 108, when provided, may be any suitable user interface that permits the HVAC controller 18 to display and/or solicit information, as well as accept one or more user interactions with the HVAC controller 18. For example, the user interface 108 may permit a user to locally enter data such as temperature set points, humidity set points, fan set points, starting times, ending times, schedule times, diagnostic limits, configuration settings, responses to alerts, and the like. In one embodiment, the user interface 108 may be a physical user interface that is accessible at the HVAC controller 18, and may include a display 86 and/or a distinct keypad. The display 86 may be any suitable display. In some instances, a display may include or may be a liquid crystal display (LCD), and in some cases an e-ink display, fixed segment display, a light emitting diode (LED) display, or a dot matrix LCD display. In one example, where the display 86 may be a fixed segment display, the fixed segment display may include a plurality of fixed segments at fixed locations that form characters, icons, and/or menu items to interact with a user of the HVAC controller 18 and/or provide information to a user of the HVAC controller 18. Alternatively or in addition, the user interface 108 may be a touch screen LCD panel or other touch sensitive screen that functions as both display and keypad. The touch screen LCD panel may be adapted to solicit values for a number of operating parameters and/or to receive such values, but this is not required. In still other cases, the user interface 108 may be a dynamic graphical user interface.

As discussed above, some HVAC controllers 18 may be non-connected HVAC controllers while others may be connected HVAC controllers. In some cases, it may be desirable to replace or upgrade a non-connected HVAC controller 18 to another HVAC controller such as a connected HVAC controller 18. In such scenarios, an installer must typically manually determine and then re-enter the settings of the non-connected HVAC controller 18 into the replacement HVAC controller. This can be time consuming, tedious and error prone.

A technique is described herein for transferring settings and/or data (e.g., ISU settings, user preferences, schedules, set points, HVAC configuration settings) from a non-connected HVAC controller 18 to another HVAC controller 18 is disclosed herein. Additionally or alternatively, the technique may be used for assisting in remote trouble shooting and/or diagnostics of a non-connected HVAC controller 18 by transferring settings and/or data to from the non-connected HVAC controller 18 to a connected device, and then uploading the settings and/or data to a remote site for review and/or analysis sometimes by a contractor or the like.

FIG. 6 depicts a schematic of an illustrative flow for transferring settings and/or data from a non-connected HVAC controller 18a to a connected HVAC controller 18b. As shown in FIG. 6, the non-connected HVAC controller 18a may be configured to encode the settings and/or data and display the encoded settings and/or data on its user interface 108. A remote device 62 may be used to capture in image of the user interface 108 of the non-connected HVAC controller 18a, and thus an image of the encoded settings and/or data. The image may be processed to decode the encoded settings and/or data. The decoded settings and/or data may then be uploaded to the connected HVAC controller 18b. In some cases, the remote device 62 may perform the image processing to decode the encoded settings and/or data. In other cases, the remote device 62 may simply transfer the captured image to another device, such as a server in the cloud 114, which then performs the image processing. In some cases, the connected HVAC controller 18b may be connected to the server in the cloud 114, and the server may upload the decoded settings and/or data to the connected HVAC controller 18b.

The remote device 62 may include memory (e.g., a computer readable medium) that includes program code for use and/or execution by the remote device 62. In response to receiving a request, such as a request received via the user interface of the remote device 62, the program code may initiate a camera operation of a camera of the remote device to capture the encoded information that is displayed on the user interface 108 of the non-connected HVAC controller 18*a*. A user may use the remote device 62 to capture a photo of the encoded information displayed on the user interface 108 of the non-connected HVAC controller 18*a*. In some cases, the program code may cause the remote device 62 to display a button 110 that may be selectable once the remote device 62 or a program running thereon is ready to capture the encoded information displayed on the non-connected HVAC controller 18*a*. Once the encoded information has been captured by the remote device 62, a button 112 may become selectable on the remote device 62 to send or transmit the captured image to a user account on a server in the cloud 114, where the user account may be associated with an owner of the non-connected HVAC controller 12. Alternatively, the program code or other program code on the remote device 62 may processes the image or a portion of the image using, for example, optical character recognition (OCR) or other image processing techniques, to decode the coded information in the image. The remote device 62 may then send or transmit the captured image to the user account on a server in the cloud 114, where the user account may be associated with an owner of the non-connected HVAC controller 12.

A connected HVAC controller 18*b*, which has been associated with the server and the user account, may then receive the settings and/or data of the non-connected HVAC controller 18*a* automatically or in response to a selection via the user interface 108 of the connected HVAC controller 18*b*.

Alternatively or in addition to using a server in the cloud 114, the remote device 62 may send the captured image and/or decoded information directly a contractor and/or a directly to a connected HVAC controller 18*b*. In some cases, if some image processing and decoding occurs in the cloud 114 (e.g., at a remote server 66), the decoded information may be send to the remote device 62 for viewing by the user.

As noted above, the settings and/or data of an HVAC controller 18 (e.g. a non-connected HVAC controller 18*a*) may be displayed in an encoded manner on the display 86. In the examples depicted herein, the encoded settings and/or data may be displayed using fixed segments of a fixed segment display, where at least some of the fixed segments on the display may be activated/deactivated to encode the particular settings and/or data of the HVAC controller. In some cases, there may be more encoded information than can be displayed using the fixed segments on a single screen. When this occurs, the encoded information may be displayed on a series of screens, where the number of screens in the series of screens may be dependent on an amount of encoded information that is to be displayed. The remote device 62 may then take an image of each screen, resulting in a series of images that each include encoded information. In some cases, a marker screen may be presented between each screen that includes encoded settings and/or data. The marker screen may be a screen that is easily identifiable to the image processor, such as a checkerboard pattern, a large "X", a blank screen, or any other suitable pattern. In some cases, the remote device 62 may capture a video of the series of screens, and the video may be processed to decode the encoded information presented in the series of screens.

Although the examples herein depict encoded information displayed as fixed segments on a fixed segment display, the encoded information may be provided in one or more other ways. For example, the encoded information may be provided as encoded static and/or moving alphanumeric characters on the display 86, encoded static and/or changing bar codes on the display 86, encoded static and/or changing Quick Response (QR) codes on the display 86, encoded static or changing pictures on the display 86, encoded video on the display, encoded sound sequences (e.g., a pulsed sound or other sound sequence), encoded light sequences (e.g., a pulsed light or other light sequence via the display 86 and/or an LED or the like), and/or any other suitable encoded signal that can be perceived and captured by the remote device 62.

Although a camera (e.g., a camera of a remote device 62) is primarily discussed herein as being used to capture encoded information presented by an HVAC controller 18, other devices may be used to capture the encoded information. For example, a video camera, a microphone, a bar code reader, a QR code reader, and/or any other suitable capture device may be used to capture encoded information provided by an HVAC controller.

Figure 7A:
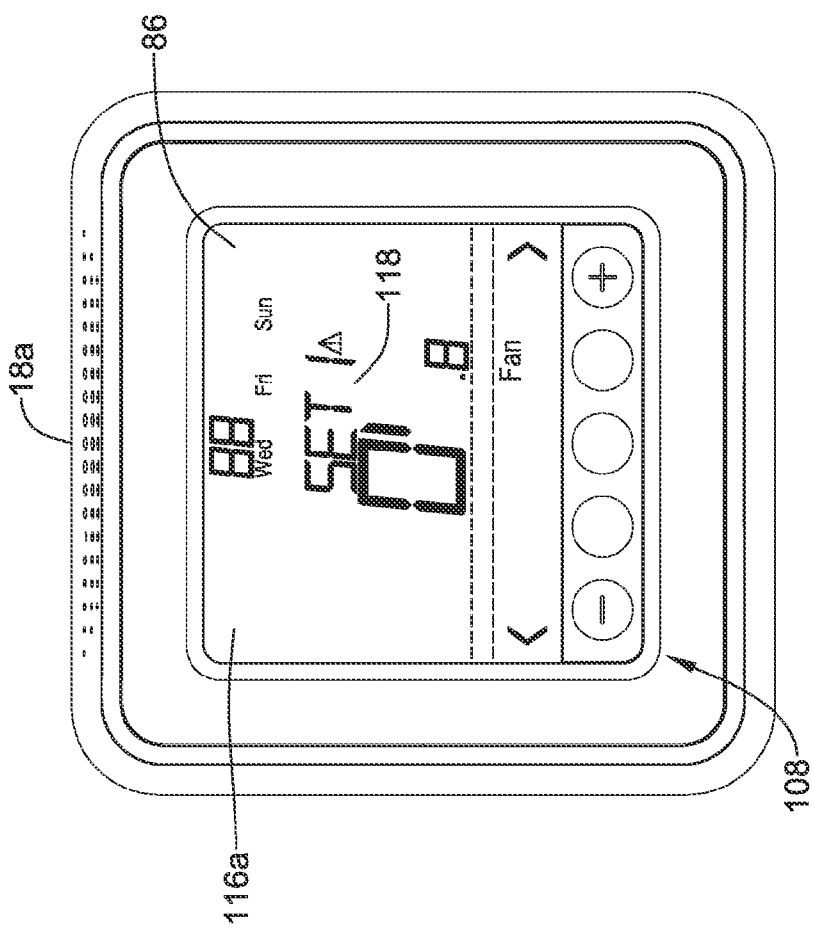
FIGS. 7A-7C are schematic views of illustrative screens of an HVAC controller showing encoded information.
Figure 7B:
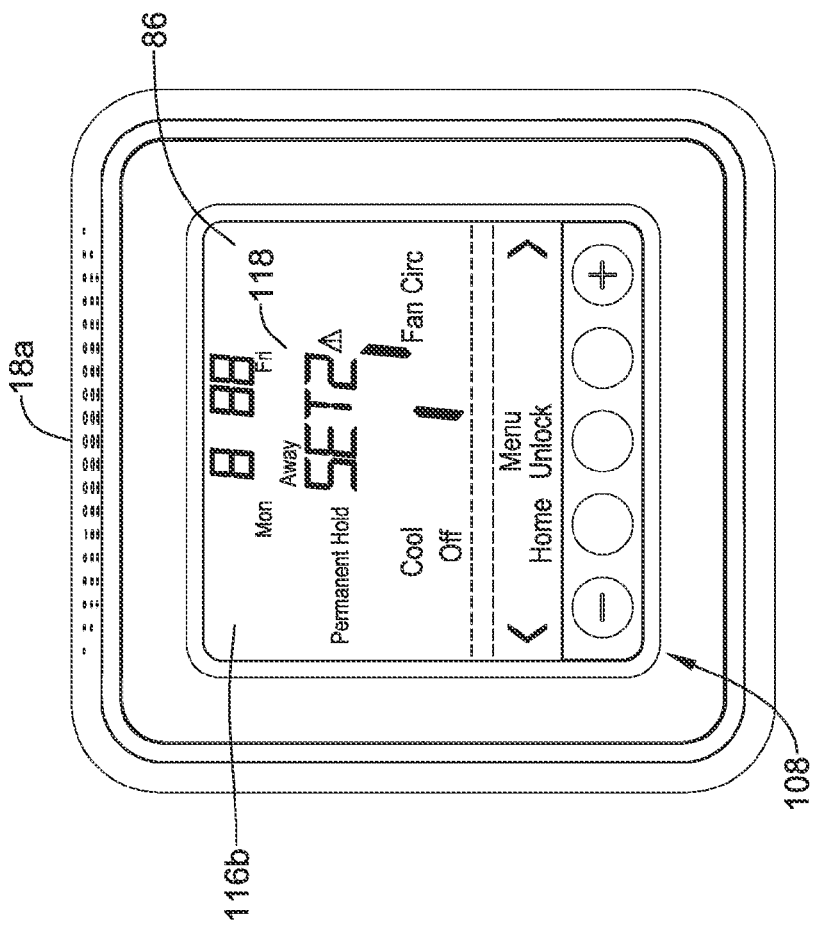
Figure 7C:
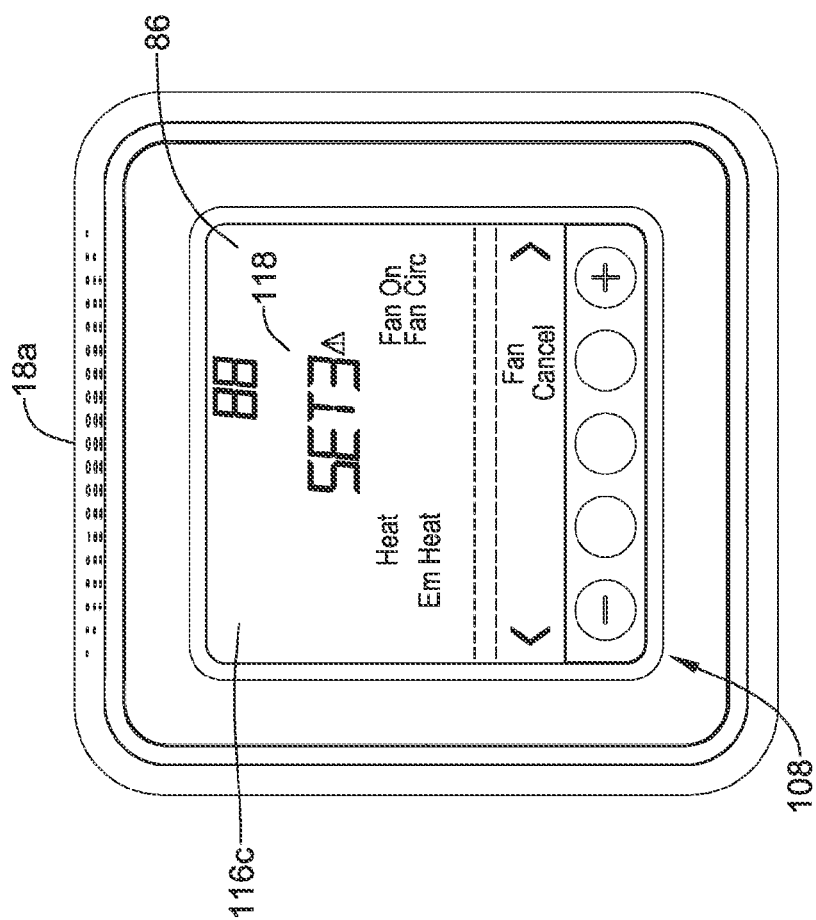

FIGS. 7A-7C depict an example set of three screens displayed on a display 86 that encode settings of an HVAC controller 18. In the example of FIGS. 7A-7C, three screens 116*a*-116*c* are used to display the encoded settings. In the examples of FIGS. 7A-7C, the screen number may be indicated by a screen number indicator 118, where the fixed segments utilized for the screen number indicator 118 may not be representative of encoded data from the HVAC controller 18 other than to indicate what set of encoded data is currently being displayed on the display of the HVAC controller 18*a*. FIG. 7A depicts encoded data on a first encoded screen 116*a* of a series of three screens, as indicated by screen number indicator 118 showing "SET 1". FIG. 7B depicts encoded data on a second screen 116*b* of the series of three screens as indicated by screen number indicator 118 showing "SET 2". FIG. 7C depicts encoded data on a third screen 116*c* of the series of three screens as indicated by screen number indicator 118 showing "SET 3".

A data encoding module of an HVAC controller 18 may encode information (e.g. settings and/or data) of the HVAC controller 18 (e.g. non-connected HVAC controller 18*a*) into a machine readable form. In some cases, to activate the data encoding module, a user may need to navigate through a menu structure of the HVAC controller to a data encoding activation screen. FIGS. 8A-8F depict an example flow for activating the data encoding module, but it is contemplated other buttons, screens, and/or flows for activating the data encoding module may be used.

Figure 8A:
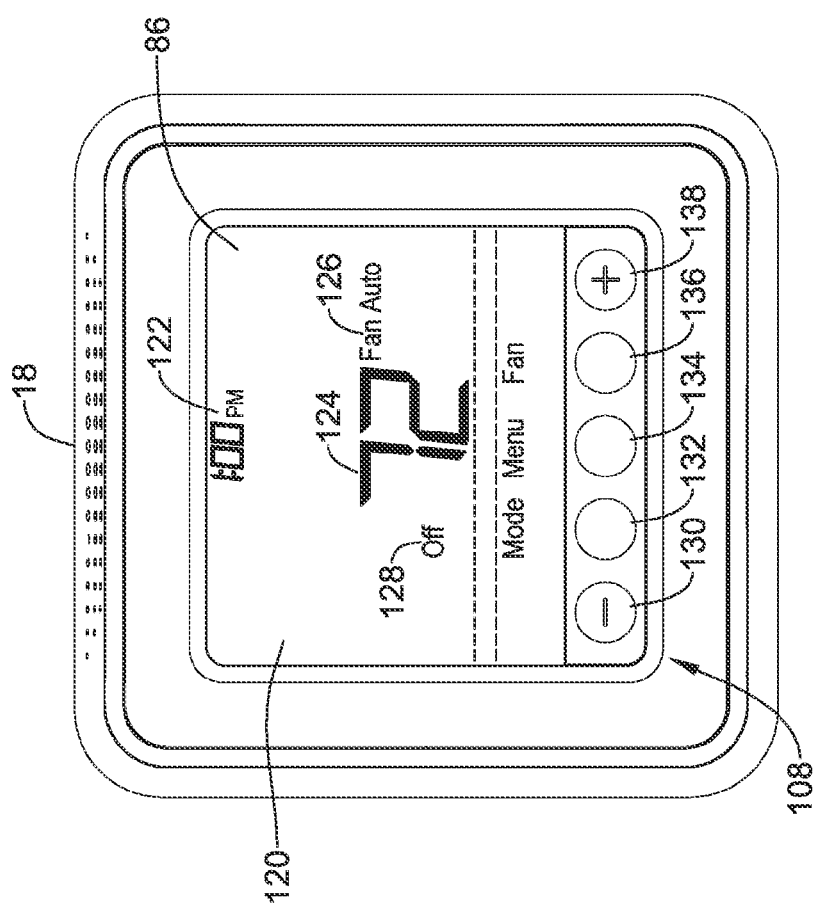
FIGS. 8A-8F are schematic views of illustrative screens of an HVAC controller showing a method for initiating an HVAC controller to encode settings and/or data on the user interface of the HVAC controller.

In FIG. 8A, HVAC controller 18 may display a home screen 120 on the display 86, which shows the time 122, current temperature 124, a fan status 126, an HVAC system status 128, a back button 130 represented by "−", a Mode button 132, a Menu button 134, a Fan button 136, and a forward button 138 represented by "+". From the home screen 120, a user may begin by selecting the Menu button 134 at the same time as the forward button 138 in order enter an installer setup screen 140 (see FIG. 8B). In some cases, requiring selection of two or more buttons simultaneously may help prevent a homeowner from inadvertently entering the installer setup screen.

Figure 8B:
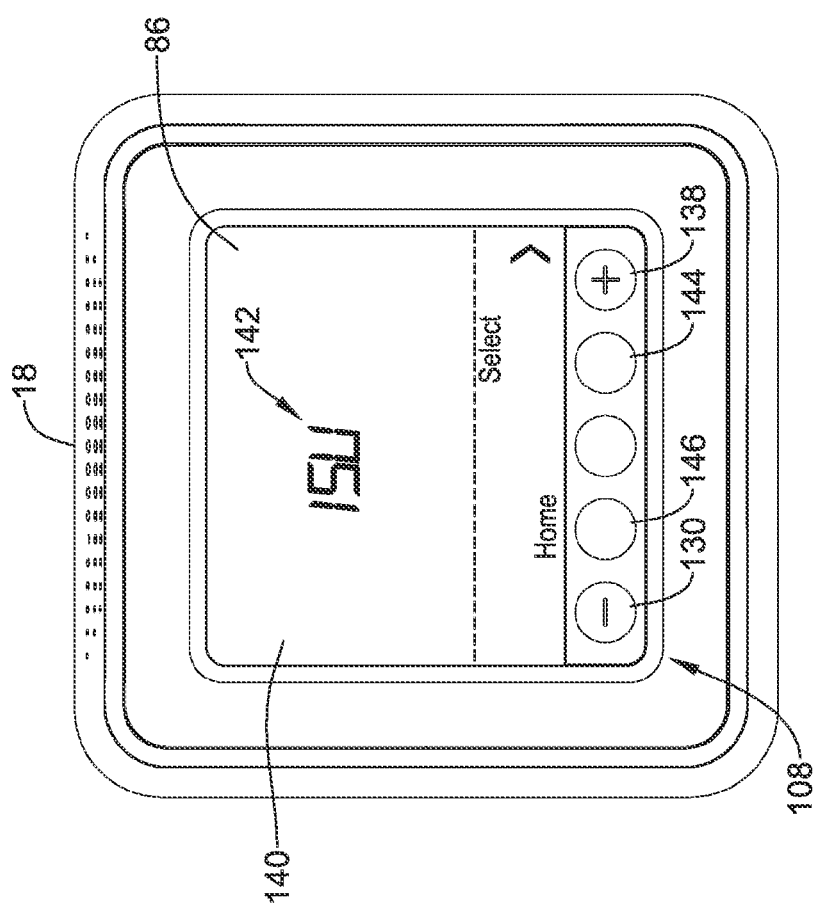

An example installer setup screen 140 is depicted in FIG. 8B, which shows a menu item indicator 142 that, in this case depicts Installer Set Up (ISU), a back button 130, a forward button 138, a select button 144, and a home button 146. One may scroll to menu items other than "ISU" by selecting the forward button 138. Once a desired menu item is displayed (e.g., the installer Set Up (ISU) in this case) at the menu item indicator 142, the user may select the designed menu by selecting the forward button 138 simultaneously with the select button 144, or in some cases, just the select button 144.

Figure 8C:
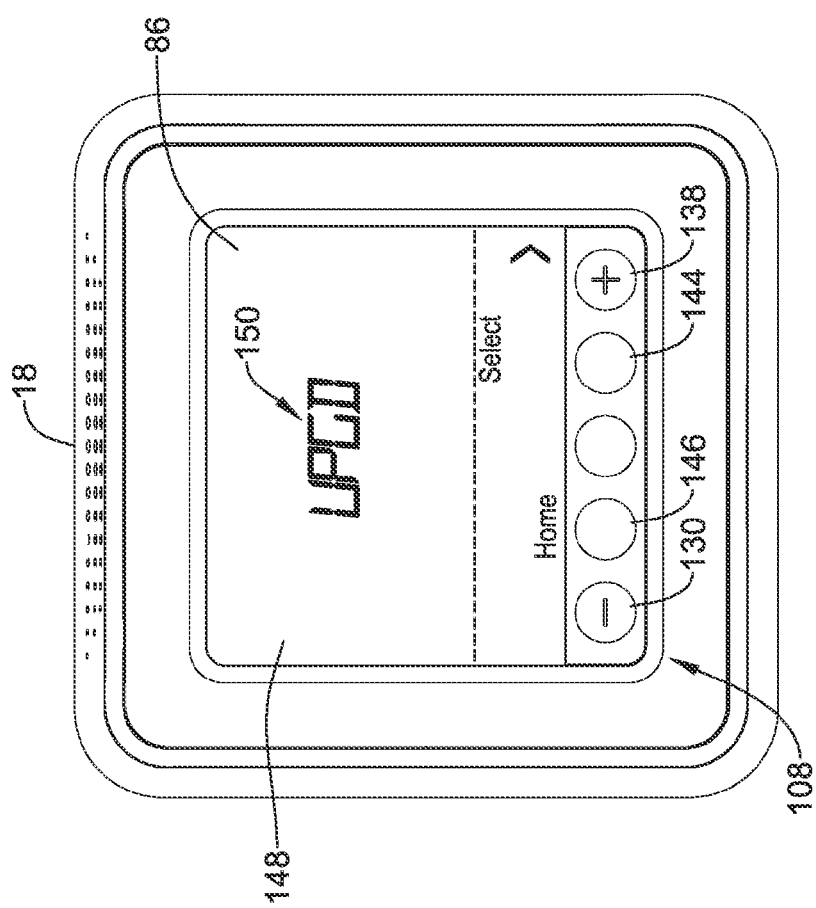

An example ISU menu screen 148 is depicted in FIG. 8C, which shows an ISU option indicator 150, a back button 130, a forward button 138, a select button 144, and a home button 146. One may scroll to ISU options other than "UPGD" by selecting the forward button 138. Once a desired ISU option is display at the ISU option indicator 150, a user may activate the selected IDS option by selecting the select button 144. In FIG. 8C, the "UPGD" option corresponds to an "Upgrade" option for use in aiding the installer upgrade the non-connected HVAC controller 18a to another HVAC controller 18b.

In some cases, in response to selecting the UPGD option, the HVAC controller 18 may prompt a user to activate an application program code on a remote device 62 that may be used to capture encoded screens, but this is not required.

Figure 8D:
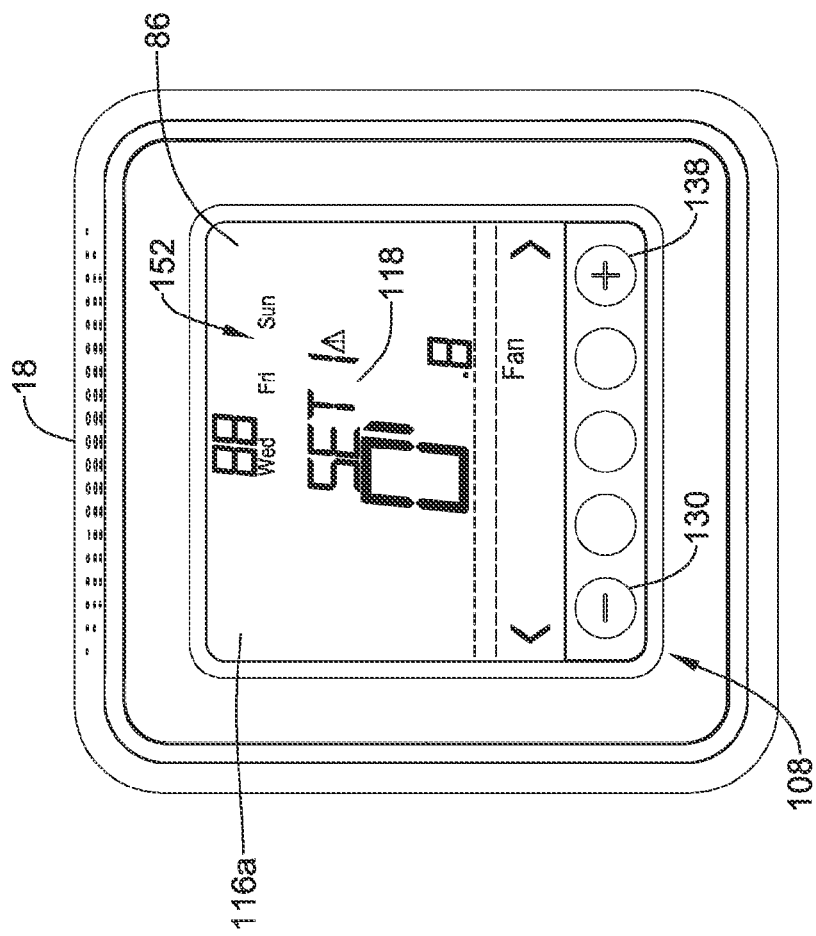

In any event, the HVAC controller 18 may then activate the data encoding module to encode information (e.g. settings and/or data) of the HVAC controller 18 (e.g. non-connected HVAC controller) into a machine readable form on the display 86. An example first encoded information screen 116a is depicted in FIG. 8D, which depicts encoded information 152, a screen number indicator 118, a back button 130, and a forward button 138. As discussed above, the encoded information 152 may take the form of a pattern of activated/deactivated fixed segments on the display 86. Once the first encoded information screen 116a is provided on the display 86, a user may photograph it with a remote device 62. In some cases, an application program code on the remote device 62 may cause a camera of the remote device 62 to take a photograph of the first encoded information screen 116a. Illustratively, the HVAC controller 18 may flash a light, flash certain characters, or provide any other trigger to provide an indication to the application program code of the remote device 62 that the encoded information is ready to be captured, but this is not required. In some cases, once the image of the encoded information has been captured by the remote device 62 and processed by the remote device 62 and/or remote server 66, the application program code on the remote device 62 may prompt the user to advance to the next screen on the HVAC controller 18, which may be a second encoded information screen 116b, by selecting the forward button 138.

Figure 8E:
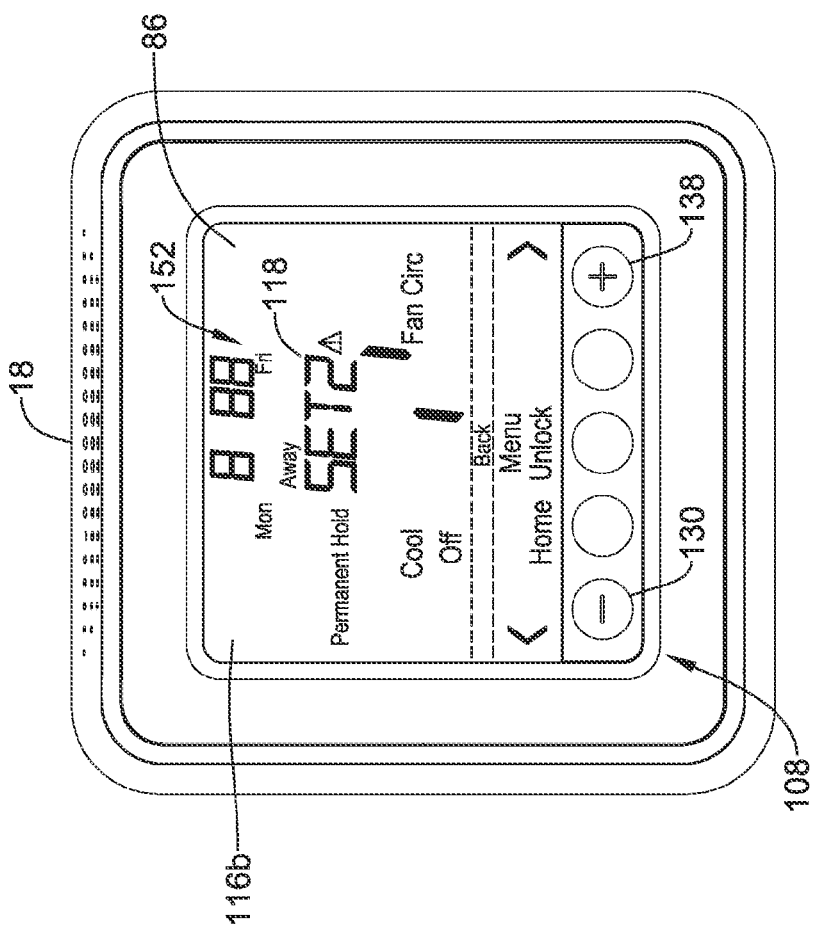

An example second encoded information screen 116b is depicted in FIG. 8E, which depicts encoded information 152, a screen number indicator 118, a back button 130, and a forward button 138. In the example shown, although "Home" and "Menu Unlock" are depicted adjacent buttons on the user interface 108, these labels are used to indicate encoded information rather than the actual function of the adjacent button. Once the second encoded data screen 116b has been depicted on the display 86, a user may photograph the screen encoded 116b with the remote device 62 in a manner similar to that described above with respect to the first encoded information screen 116a. In some cases, once the image of the encoded information has been captured by the remote device 62 and processed by the remote device 62 and/or remote server 66, the application program code on the remote device 62 may prompt the user to advance to the next screen on the HVAC controller 18, which may be a third encoded information screen 116c, by selecting the forward button 138.

Figure 8F:
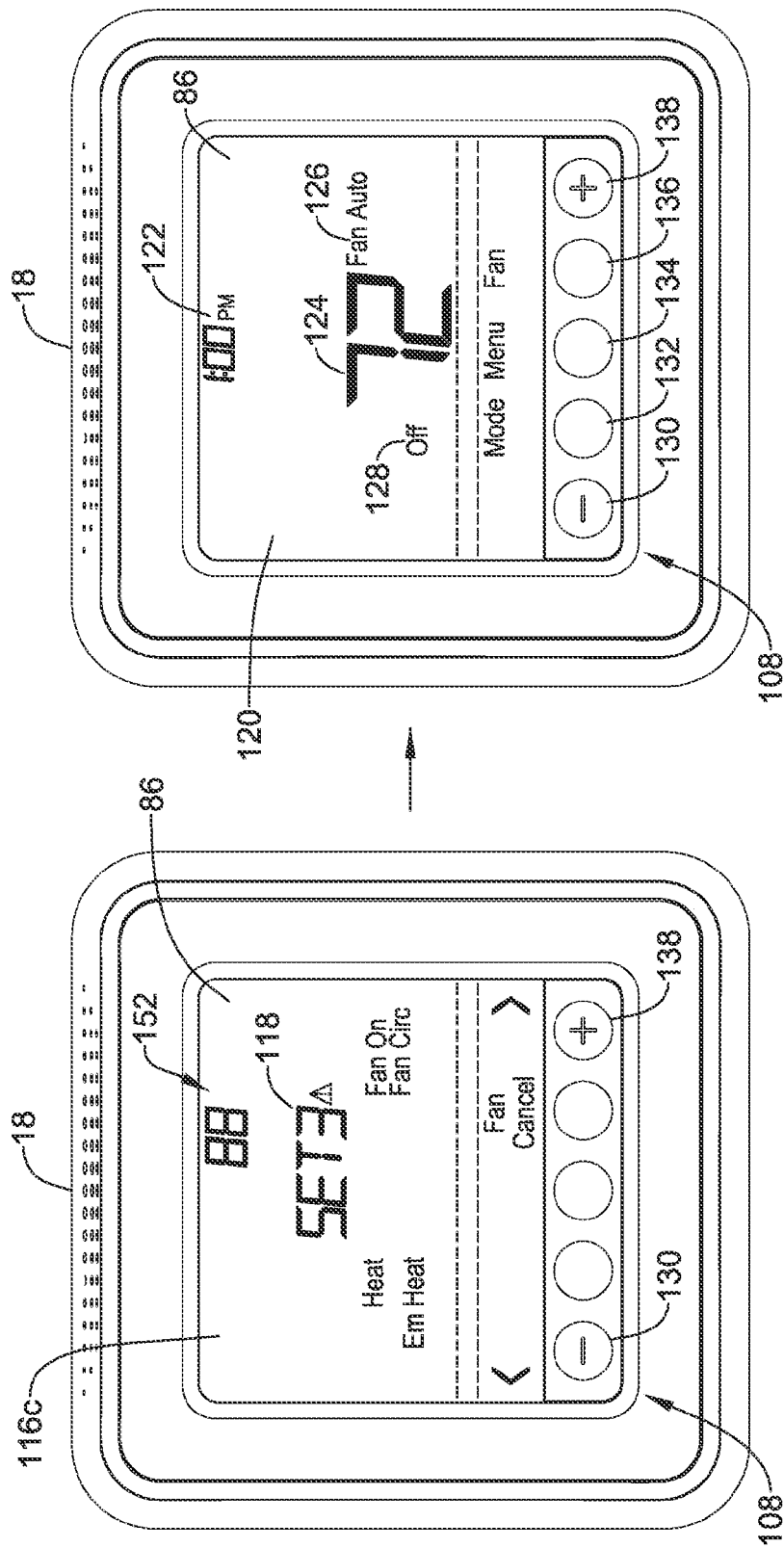

An example of a third encoded information screen 116c is depicted in FIG. 8F, which depicts encoded information 152, a screen number indicator 118, a back button 130, and a forward button 138. Although "Fan Cancel" is depicted adjacent a button on the user interface 108, this label is used to indicate encoded information rather than the function of the adjacent button. Once the third encoded information screen 116c is depicted on the display 86, a user may photograph the encoded screen 116c with the remote device 62 in a manner similar to that described above with respect to the first and second encoded information screens 116a-116b. In some cases, once the image of the encoded information has been captured by the remote device 62 and processed by the remote device 62 and/or remote server 66, the application program code on the remote device 62 may prompt the user to advance to the next screen, if any, on the HVAC controller 18 by selecting the forward button 138. Alternatively, if all of the encoded information screens have been displayed by the HVAC controller 18, the application program code on the remote device 62 may prompt a user to exit the UPGD option by selecting the forward button 138 and a further button (e.g., a button adjacent the forward button as seen in FIG. 8F) simultaneously. Exiting the UPGD option may return the display 86 of the HVAC controller 18 to the home screen 120, as shown in FIG. 8F, a menu screen, or other screen.

Figure 9:
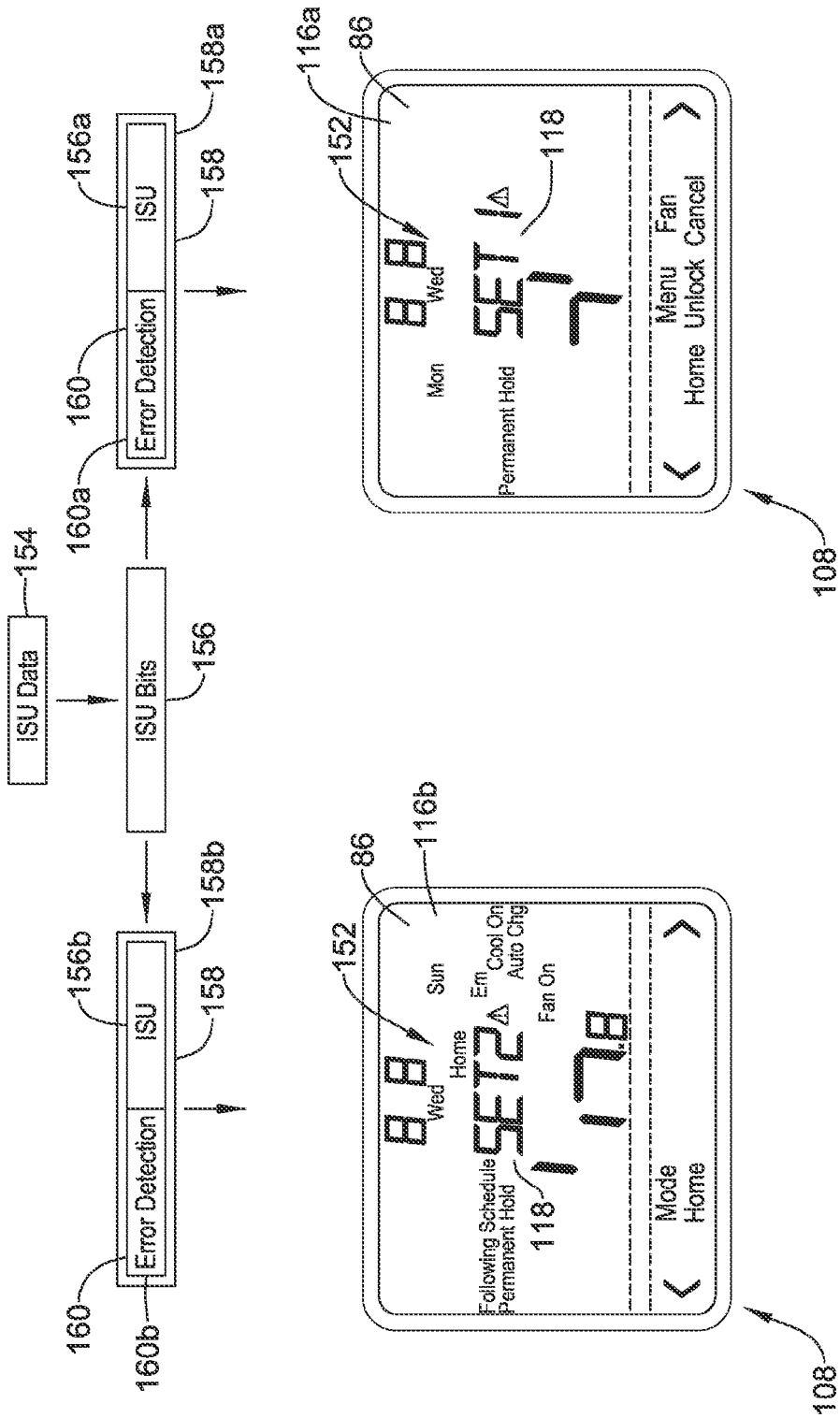
FIG. 9 is a schematic flow diagram showing an illustrative method for encoding settings and/or data on the user interface of an HVAC controller.

The information (e.g., settings and/or other data) of the HVAC controller 18 may be encoded through any suitable technique. An example technique, as referred to above, may include encoding data using fixed segments of a fixed segment display. FIG. 9 depicts an example flow diagram illustrating how information of an HVAC controller 18 may be encoded using fixed segments of a fixed segment display. As shown in FIG. 9, information (e.g., settings and/or data 154) of an HVAC controller 18 may be converted to binary bits (0s and 1s) of an information word 156. The information word 156 may have predefined fields, wherein each field may correspond to a setting or data field to be communicated. Each field may have a sufficient number of bits to accommodate all valid values for the corresponding setting or data field. Each bit may then be assigned to a corresponding fixed segment on the fixed segment display. A value of "1" for that bit may be represented by the corresponding fixed segment being activated, while a value of "0" for that bit may be represented by the corresponding fixed segment being deactivated.

In some cases, the information word 156 may be split into one or more partitions 158, such as a first partition 158a and a second partition 158b, as shown in FIG. 9. Although two partitions are shown in FIG. 9, one partition or more than two partitions may be utilized depending on an amount of information to be encoded. In the examples of FIGS. 7A-7C and 8A-8F, one partition may be created for each screen 116a-116c. In one example, each partition may hold 53 bits, where 45 bits are available for encoded data and 8 bits may be used for error correction bits. However, this is not required and it is contemplated any number of bits may be utilized per partition and the number of bits may be allocated between encoded information bits and error correction bits, as desired. The error correction bits may be set in accordance with a cyclic redundancy check (CRC) or one or more other error correction techniques, as desired.

Once the bits have been partitioned, a set of error correction bits 160 may be appended to each partition 158. In one example, a first set of error correction bits 160*a* may be associated with a first set of bits 156*a*, and a second set of error correction bits 160*b* may be associated with a second set of bits 156*b*. After the information from the HVAC controller 18 has been encoded into bits and in some cases partitioned, the partitions 158 (e.g., first partition 158*a* and second partition 158*b*) may be converted to a corresponding set of fixed segments for display on encoded data screens 116*a* and 116*b*. In some case, and as noted above, if a bit has a value of 1, the corresponding fixed segment on the fixed segment display may be activated, while if the bit has a value of 0, the corresponding fixed segment on the fixed segment display may be deactivated.

Figure 10:
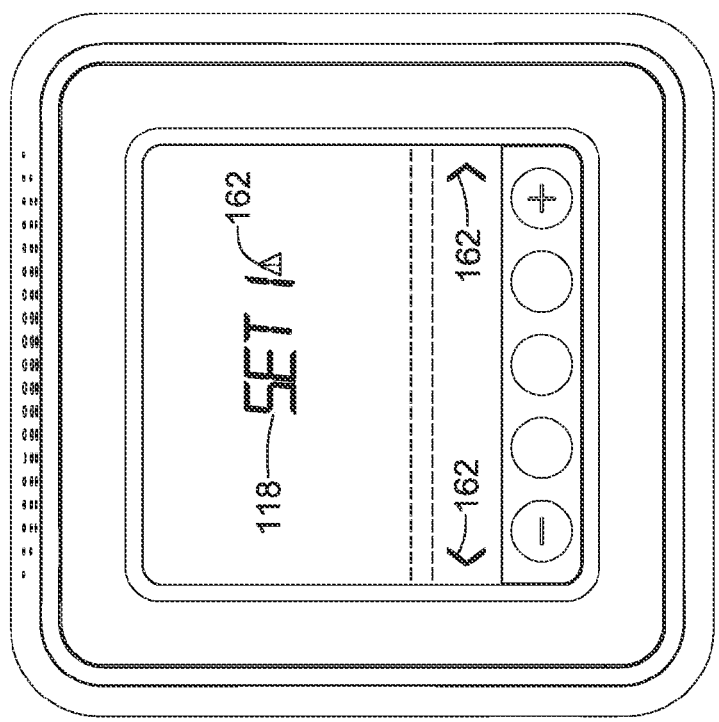
FIG. 10 is a schematic view of an HVAC controller having a screen depicting alignment features and a screen number.

Not all fixed segments on a fixed segment display may be utilized for displaying encoded information. For example, as discussed above, the display 86 may include a screen number indicator 118. Additionally or alternatively, the display may include one or more alignment markers 162 that may or may not include at least a portion of the screen number indicator 118. Alignment markers 162 may be used to help ensure a proper amount of the display 86 of the HVAC controller 18 is captured in an image by the remote device 62 and/or to ensure proper alignment of an image of the display 86 by the remote device 62 for decoding of the encoded information screen. In one example of alignment markers 162, FIG. 10 depicts fixed segments (e.g., a warning symbol with an "!" inside a triangle, and forward and back arrows) used as alignment markers 162. Other fixed segments may be used as alignment markers 162, as desired.

Figure 11A:
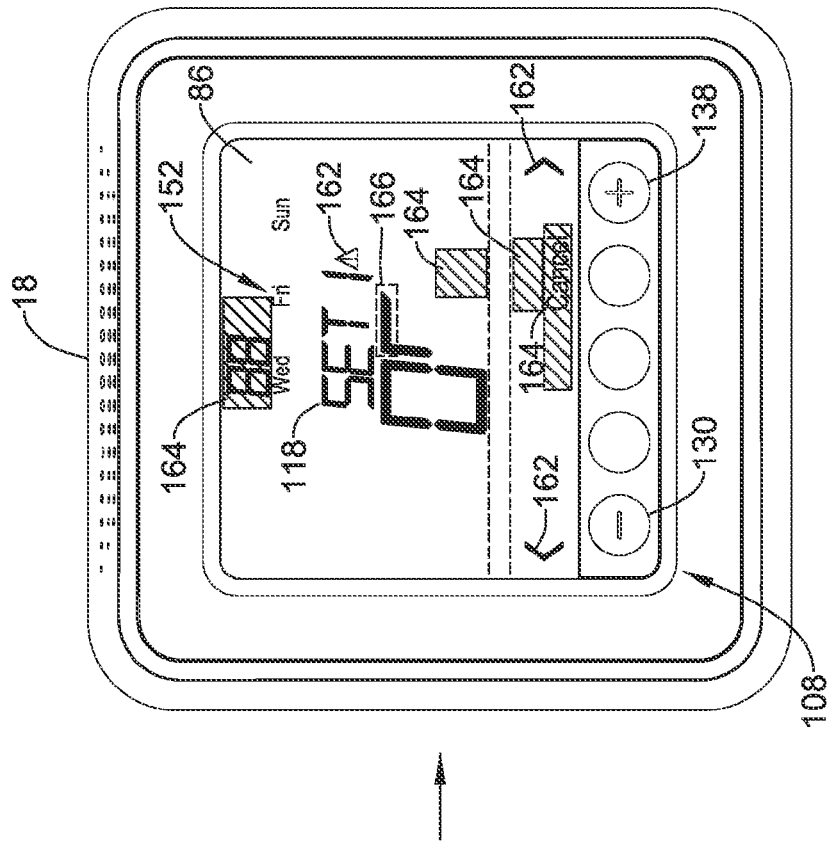
FIG. 11A is a schematic diagram of an HVAC controller screen depicting encoded information.
Figure 11B:
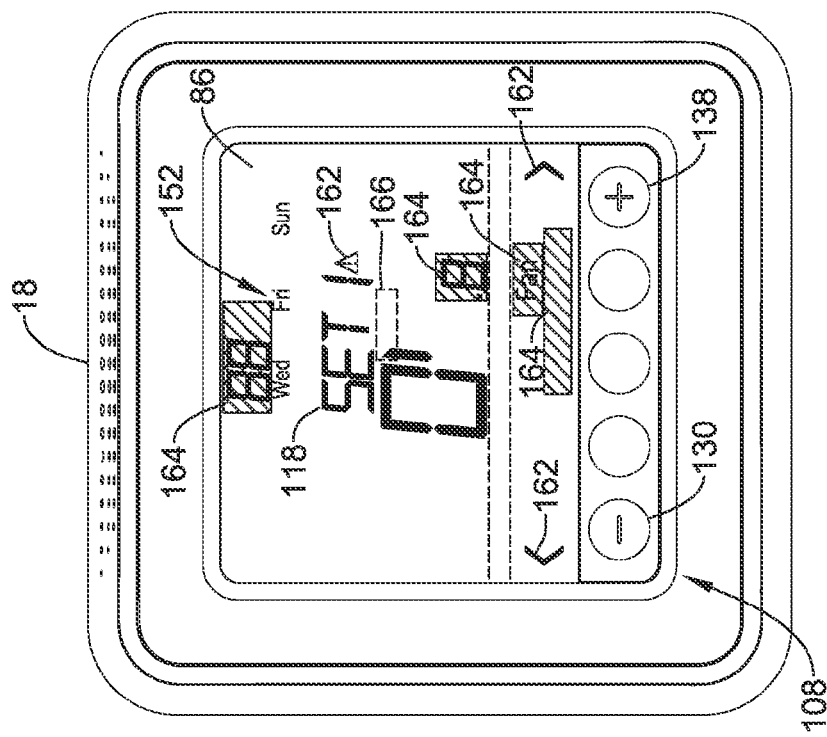
FIG. 11B is a schematic diagram of an HVAC controller screen depicting the same information encoded in FIG. 11A with a one bit change.

FIG. 11A is a schematic diagram of an HVAC controller screen depicting encoded information. FIG. 11B is a schematic diagram of an HVAC controller screen depicting the same information encoded in FIG. 11A with a one bit change. In FIGS. 11A and 11B, the highlighted fixed segment locations 164 may be used for error correction bits 160, and the boxed fixed segment 166 may be used to indicate which fixed segment is displayed in response to an associated bit changing from a value of "0" in FIG. 11A to value of "1" in FIG. 11B.

Although other settings of an HVAC controller 18 may change and/or be modified, FIGS. 11A and 11B may depict a change of operating the HVAC controller 18 in Fahrenheit, which has a bit value of "0", to operating the HVAC controller 18 in Celsius, which has a bit value of "1". This change is apparent from FIGS. 11A and 11B, as there is an empty box 166 in FIG. 11A and the box 166 in FIG. 11B is shown to be activated. The fixed segments depicted in the highlighted fixed segment location 164 also change from the screen depicted in FIG. 11A to the screen depicted in FIG. 11B. This is because the fixed segments in the highlighted fixed segment location 164 represent error correction bits, which were updated when the one bit Fahrenheit versus Celsius change occurred.

Once encoded information is displayed on the display and captured by the remote device 62, the encoded information may be extracted and decoded by the remote device 62 and/or a server in the cloud or the like. In some cases, encoded information may be captured in an image, the image may be processed to extract and decode the encoded information. In one example of processing an image, an Optical Character Recognition (OCR) program may be utilized to convert the image(s) to characters that can be recognized and/or analyzed by a computer (e.g., a computer readable data set). Once the image has been processed into a machine readable format through the OCR program or other tool, the image may be analyzed to detect and decode the encoded data.

Figure 12:
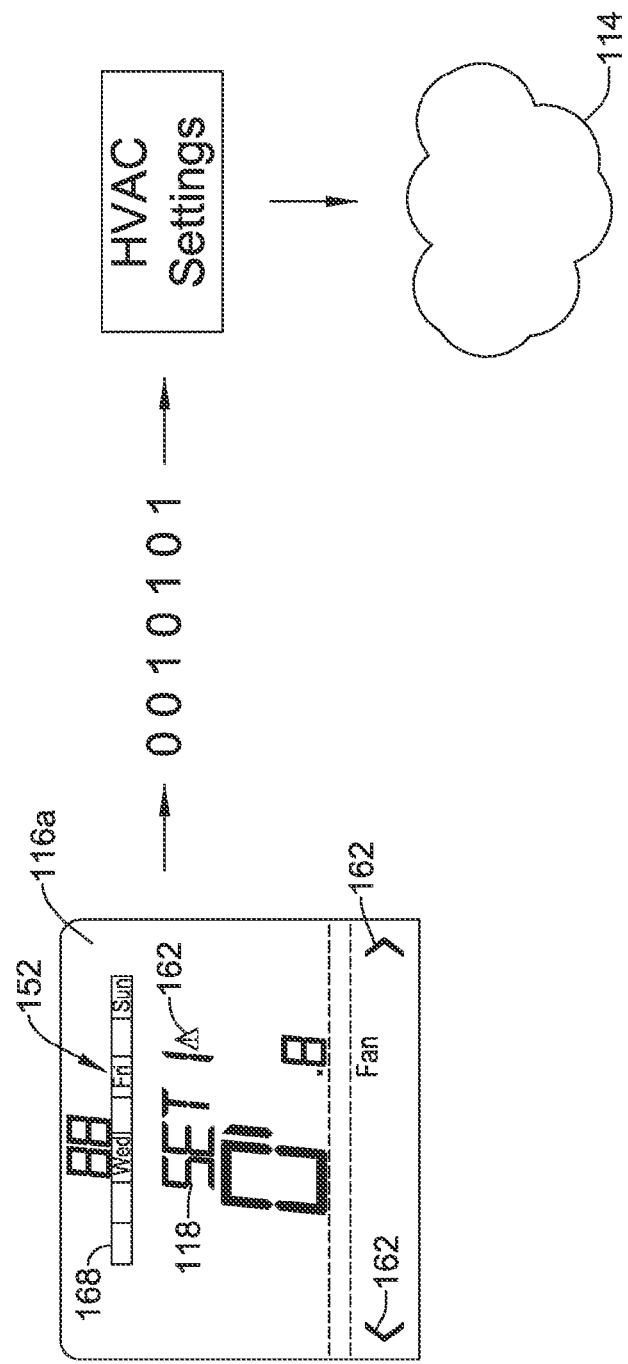
FIG. 12 is a schematic flow diagram of an illustrative process of using the encoded information.

FIG. 12 depicts another example decoding process. In this example, a captured first encoded screen 116*a* may be segmented to identify where fixed segments are located. In FIG. 12, for simplicity purposes, only a portion of the fixed segment locations have been segmented showing seven blocks representative of the days of the week. In this example, where a day of the week is present, a bit associated with that box may be considered to have a value of "1" and where a day of the week is not present, a bit associated with that box may be considered to have a value of "0". As a result, the fixed segments of the seven boxes depicted in FIG. 12 have an associated bit sequence of "0010101". These bits are then converted into HVAC controller information (e.g., settings), and in some cases may be saved in a user account in the cloud 114, sent to an Internet connected HVAC controller 18, and/or stored at the remote device 62. Although decoding only seven fixed segment locations in the first encoded data screen 116*a* is shown in FIG. 12, other fixed segment locations may be decoded in a similar manner to determine further encoded HVAC controller information.

Figure 13:
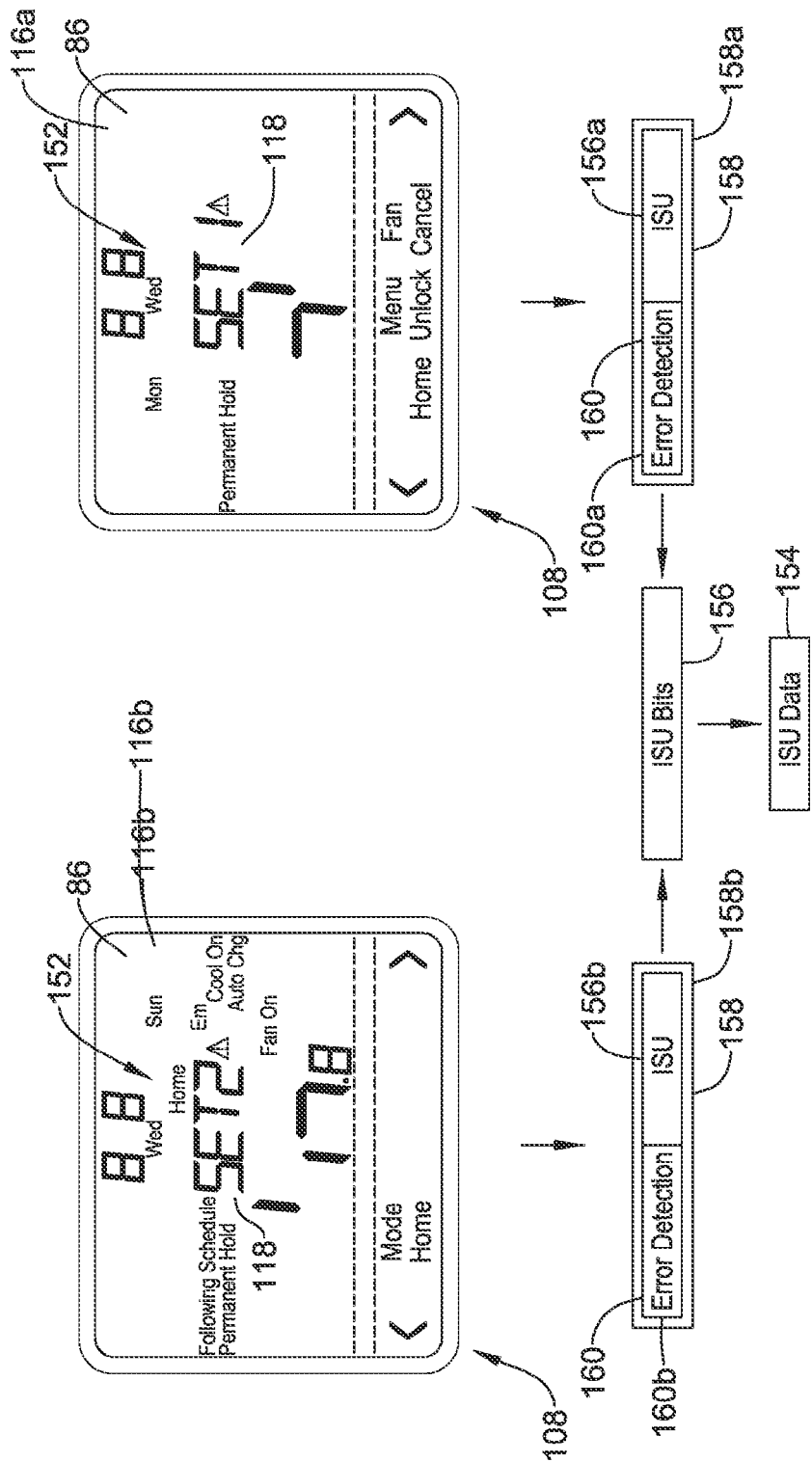
FIG. 13 is a schematic flow diagram of an illustrative decoding process.

FIG. 13 is a flow diagram of an illustrative decoding process, which on a general level may include the steps depicted in FIG. 9, among others, but in reverse order. For example, the captured encoded information screens (e.g., first encoded data screen 116*a* and second encoded data screen 116*b*) may be analyzed with a processing program to place the screens in a machine readable format. Once the processing of the encoded information screens has occurred, the fixed segment locations on the respective encoded information screens may be converted to bit values and organized according to partitions 158 (e.g., a first partition 158*a* and a second partition 158*b*). Once it is confirmed that the error correction bits are converted as expected, the first partition 158*a* and the second partition 158*b* may be combined to form the information word 156 associated with information of the HVAC controller. The information word 156 may then be decoded into settings and/or data 154 (e.g., HVAC controller settings) and stored for later use and/or sent for analysis.

Figure 14A:
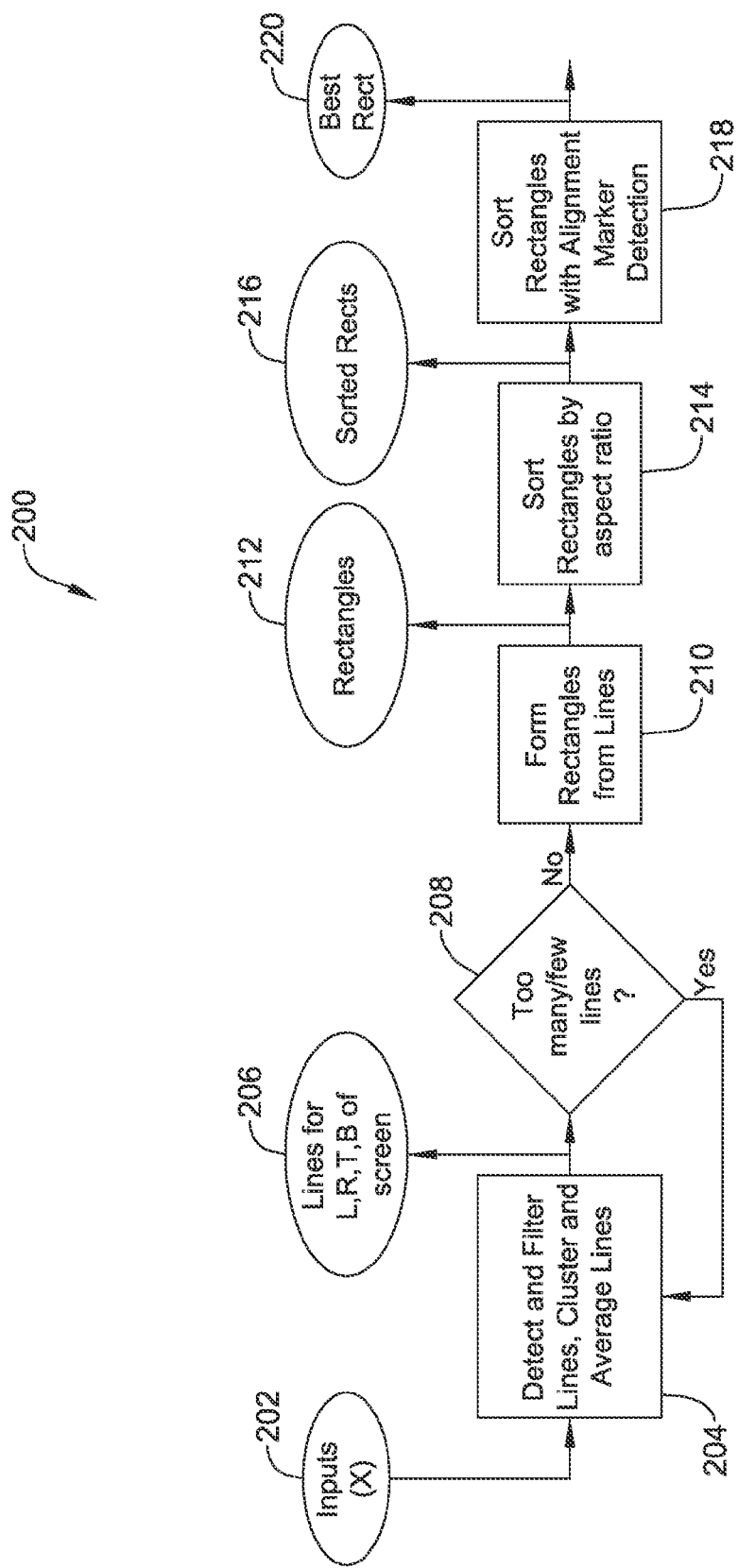
FIGS. 14A and 14B are schematic flow diagrams of an illustrative decoding process.
Figure 14B:
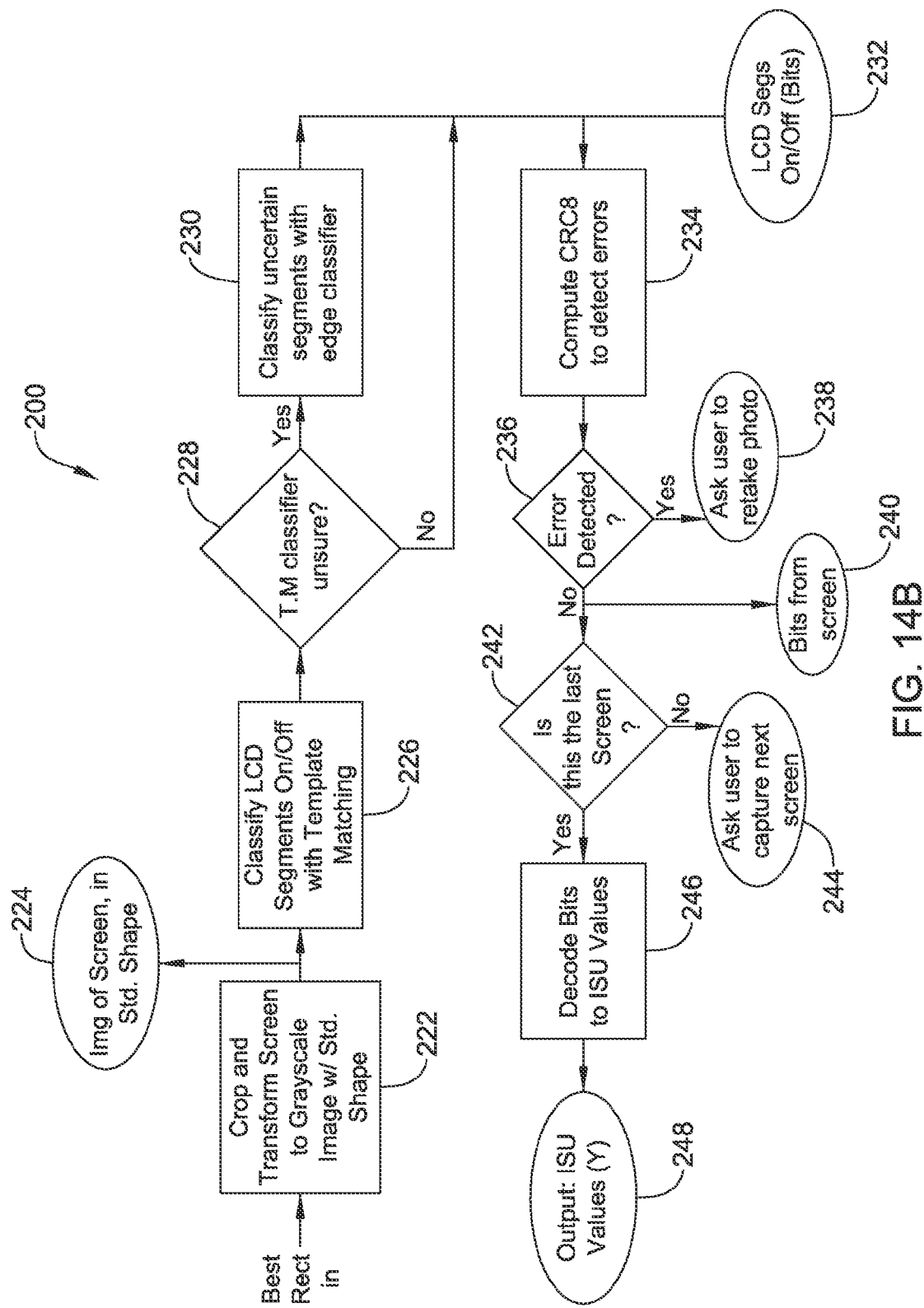

As discussed, any desired technique may be utilized to decode the encoded data from an image of a screen depicting the encoded information. FIGS. 14A and 14B depict a schematic flow diagram of an illustrative decoding method 200. At step 202, inputs may be received, where the inputs may be one or more images of one or more screens (e.g., encoded data screens 116*a*, 116*b*, 116*c*). At step 204, an application program stored on the remote device 62 or at a remote server 66 may detect and/or filter lines and cluster and/or average lines identified in an image. For example, if a plurality of lines adjacent one another and running the same direction are identified, the application program code may combine and/or average those lines into a single line. At step 206, the application program code may identify a left (L), a right (R), a top, (T), and a bottom (B) line for defining the screen (e.g., one of encoded screens 116*a*, 116*b*, 116*c*) in the captured image. Then, at step 208 a decision may be made as to whether too many, too few, or the right number of lines have been identified in the image. If too few or too many lines have been identified, the application program code may return to step 204 to detect and average lines again. If the application program retries to identify lines more than a pre-set number of times, the application program code may request a user to re-take a photograph of the screen of the HVAC controller 18. If the correct number of lines (e.g., a number of lines within a range of a number of lines or an exact number of lines) have been identified, the application program may proceed to step 210.

At step 210, the application program code may form rectangles from the identified lines, where the rectangles are used to identify the screen. The formed rectangles may be formed according to parameters (e.g., a minimum size, etc.). The rectangles may be identified at step 212 and sorted at step 214 according to an aspect ratio of an expected image of a screen. At step 216 the sorted rectangles may be identified and at step 218 the rectangles may be further sorted according to detection of alignment markers 162 and a best rectangle defining the capture screen image may be identified at step 220.

Turning to FIG. 14B, which is a continuation of the flow diagram of FIG. 14A, at step 222 a screen as defined by the identified best rectangle may be cropped and converted to grayscale to provide the screen in a standard shape and/or format at step 224. At step 226, fixed segments may be classified as being on or off by comparing and/or matching the standardized screen image to a template.

Figure 15:
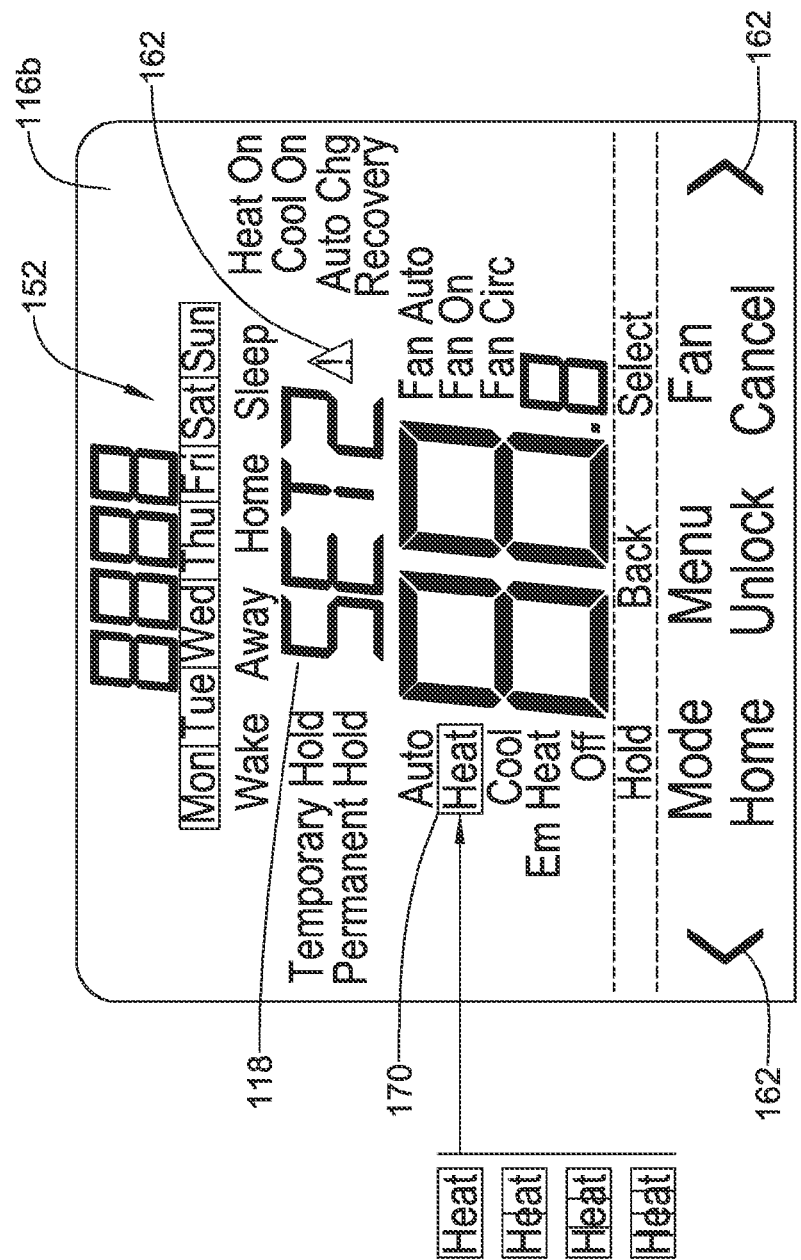
FIG. 15 is a schematic diagram depicting an image processing step of an illustrative decoding process.

FIG. 15 depicts an illustrative example of template matching. For each fixed segment location (e.g., as identified by box 170 in FIG. 15 for the fixed segment HEAT) template matching either expects to identify the fixed segment is displayed or is not displayed. To ensure a fixed segment is properly identified as being displayed or not, the template matching system may determine multiple times whether the fixed segment is present in the fixed segment location. For example, on a first try, the template matching may determine if the fixed segment is present by looking at the entire box 170 as one, then it may determine if the fixed segment is present by looking at each half of the box 170, then it may determine if the fixed segment is present by looking at each third of the box 170, and then it may determine if the fixed segment is present by look at each fourth of the box 170. Although four iterations are described, more or fewer iterations may be utilized. Once the iterations have been completed, the template matching may combine its findings and determine whether it can indicate a fixed segment is displayed or is not displayed.

Returning to FIG. 14B at step 228, the application program code may determine whether the template matching was unsure about whether a fixed segment was on or off in the image. If it is determined the template matching was unsure about whether a fixed segment was on or off, uncertain fixed segments or fixed segment locations may be analyzed with an edge classifier at step 230. In some cases, an edge classifier may utilize a Sobel filter and/or Otsu thresholding, but this is not required and other techniques may be used.

Figure 16:
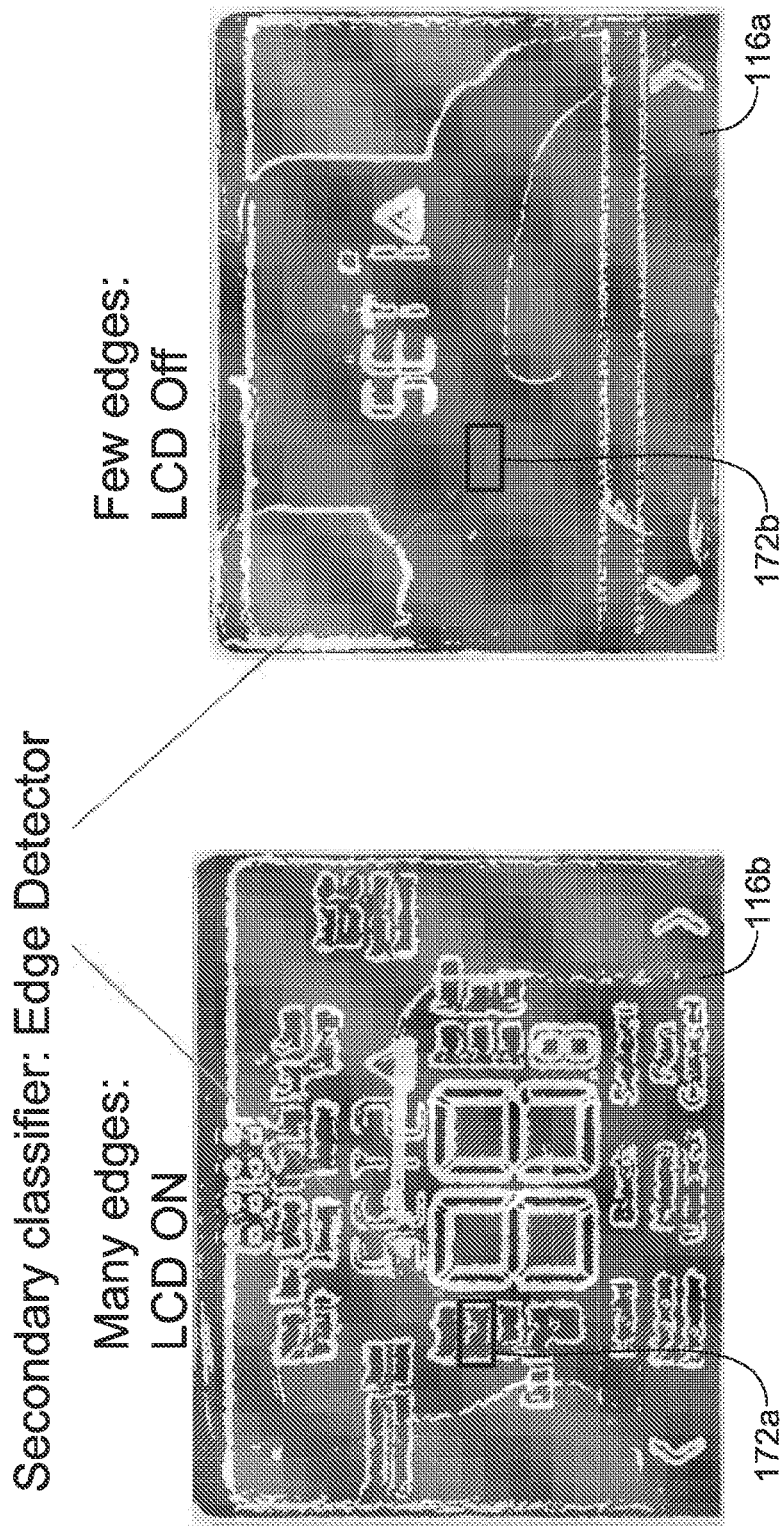
FIG. 16 is a schematic diagram depicting an image processing step of an illustrative decoding process.

Illustrative photographs that have had an illustrative edge classifier applied thereto are depicted in FIG. 16. When an edge classifier has been applied to a photographed screen, the edge classifier may determine a fixed segment is displayed if many edges are found at a fixed segment location and may determine a fixed segment is not displayed if only a few edges or no edges are found at a fixed segment location. As seen in FIG. 16, the edge identifier may indicate the fixed segment at the fixed segment location of box 172a is displayed and may indicate the fixed segment at the fixed segment location of box 172b is not displayed. Although it is not required, edge classifying may be used as a secondary classifier relative to a primary classifier of template matching.

Returning to FIG. 14B, once the segments have been classified with an edge classifier to determine if fixed segments are on or of the application program code proceeds to step 232 and identifies all fixed segments as either being on or off. Similarly, if the template matching is sure it has identified all of the fixed segments in the image as being on or off, the application program proceeds to step 232 and identifies all fixed segments as either being on or off.

Once the fixed segments of a screen have been identified as being on or off in step 232, the application program may compute the bits used for error detection and determine at step 236 if the bits for error detection match an expected sequence. If an error is detected at step 236, the application program code may ask a user to re-take the photo at step 238. If no error is detected (e.g., the error detection bits match the expected bit sequence), the encoded data bits from the screen may be identified at step 240 and this may occur on the remote device 62 or at the remote server. Once the encoded data bits from the screen have been identified, the application program code at step 242 may determine whether the screen is the last in a sequence of screens (e.g., screens 116a-116c or other sequence of screens). The application program code may make this determination automatically or it may prompt a user for an indication. If there is one or more subsequent screens to capture, the application program code at step 244 may ask a user to capture a next screen with the remote wireless device 62 and repeat the previous steps of method 200.

Once the encoded data bits from the last screen have been obtained, all of the bits may be decoded from binary code (e.g., 0s and 1s) to HVAC controller data values (e.g., ISU settings) at step 246. Alternatively, encoded data bits may be decoded from binary to HVAC controller data values directly after receiving the encoded data bits from a screen without waiting for the encoded data bits from all screens associated with an HVAC device 18. Although it is not depicted in the flows of FIGS. 14A and 14B, the application program code may perform a check of key settings of the HVAC controller 18 to determine if the encoding and decoding process was successful and to help ensure the obtained data values are accurate and complete. Then, the HVAC controller data values may be outputted at step 248 to a further HVAC controller 18 (e.g., an internet connected device), to a contractor, to a user account associated with the HVAC controller 18 from which the screens were obtained, and/or to one or more other location. In some cases, the decoded HVAC controller data values may be outputted from the remote device 62 via text message, email, social media message/post, and/or other communication.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of exporting settings of a non-network connected building controller, the method comprising:
  assembling and displaying via a user interface of the building controller:
    at a first time, a first encoded information screen that encodes, via one or more of a plurality of fixed segments on a fixed segment display, first settings for the building controller, and
    at a second time, a second encoded information screen that encodes, via one or more of the plurality of fixed segments on the fixed segment display, second settings for the building controller,
  wherein the first settings and the second settings are in a respective binary information word configured to be captured by a camera of a computing device, wherein the building controller is configured to communicate with and control one or more components of a building system, wherein the user interface comprises a fixed segment display, the fixed segment display comprising a plurality of fixed segments at least some of which define a line on the fixed segment display, the plurality of fixed segments configured to be selectively activated to define screens for interacting with a user of the building controller, and wherein the binary information word has a plurality of fields, wherein each field of the plurality fields corresponds to a particular setting of the first settings and the second settings, and wherein each bit of the binary information word is represented by an activated or deactivated segment of the fixed segment display;

capturing a first image of the first encoded information screen at the first time;

capturing a second image of the second encoded information screen at the second time; and processing the first image and the second image to decode the first settings and the second settings of the building controller to produce two or more settings encoded in an output.

2. The method of claim 1, further comprising sending the two or more settings to a network connected building controller for use by the network connected building controller.

3. The method of claim 1, further comprising:
capturing, by a camera of a mobile computing device, the first image and the second image; and
processing, by the mobile computing device the captured first image and the second image to decode the two or more of the settings of the building controller.

4. The method of claim 1, further comprising:
capturing, by a camera of a mobile computing device, the first image and the second image;
sending, by the mobile computing device the captured first image and the second image to a remote server; and
processing, by the remote server the captured first image and the second image to decode the two or more of the settings of the building controller.

5. The method of claim 1, wherein the first image provides two or more of the settings of the building controller;
wherein the second image provides two or more of the settings of the building controller;
the method further comprising:
combining information in the first image with information in the second image during processing of the first image and the second image to decode the two or more settings of the building controller from the first image and the second image.

6. The method of claim 1, wherein an output displayed by the building controller provides encoded error detection codes, the method further comprising:
requesting a user to re-capture an image of the output displayed by the building controller in response to detecting an error during decoding of the encoded error detection codes.

7. A building controller configured to communicate with and control one or more components of a building system of a building, the building controller referencing settings that are customizable by a user for a particular installation, the building controller comprising:

a user interface including a fixed segment display, the fixed segment display comprising a plurality of fixed segments at least some of which define a line on the fixed segment display, the plurality of fixed segments configured to be selectively activated to define screens for interacting with the user of the building controller;

a controller operably coupled to the user interface, the controller configured to at least partially control the building system of the building based, at least in part, on the settings; and in response to a selection by the user via the user interface, the controller is configured to assemble and present via the user interface of the building controller:
a first encoded information screen that encodes, via one or more of the plurality of fixed segments on the fixed segment display at a first time, first settings for the building controller, and
a second encoded information screen at a second time that encodes, via one or more of the plurality of fixed segments on the fixed segment display, second settings for the building controller,
wherein the first settings and the second settings are in a respective binary information word configured to be captured by a camera of a computing device, and
wherein each respective binary information word has a plurality of fields,
wherein each field of the plurality fields corresponds to a particular setting of the first settings and the second settings, and
wherein each bit of the respective binary information word is represented by an activated or deactivated segment of the fixed segment display.

8. The building controller of claim 7, wherein:
the user interface includes a button; and
selection of the button by the user causes the controller to assemble and present via the user interface an output that encodes the first settings and the second settings in a machine readable form.

9. The building controller of claim 8, wherein the first settings and the second settings encoded in the output comprise one or more of a model number for the building controller, a type of building equipment connected to the building controller, a model number of equipment connected to the building controller, one or more building controller installer settings, and one or more building schedule parameters.

10. The building controller of claim 7, wherein the one or more components of the building system comprise one or more Heating, Ventilation, and/or Air Conditioning (HVAC) components.

11. The building controller of claim 7, wherein the one or more components of the building system comprise a security system.

12. The building controller of claim 7, wherein the one or more components of the building system comprise a fire suppression system or an energy management system.

13. A system comprising:
the building controller of claim 7; and
a computing device comprising a camera configured to capture a first image of the first encoded information screen at the first time and a second image of the second encoded information screen at the second time,
wherein the computing device is configured to identify two or more settings for the building based on the captured first image and the captured second image and transmit the identified two or more settings to a network connected device, and wherein the computing device is configured to identify the two or more settings by decoding the first encoded information screen and the second encoded information screen based on the plurality of fixed segments in the fixed segment display included in the first captured image and the second captured image.

14. The system of claim 13, wherein to decode the first encoded information screen and the second encoded information screen, the computing device is configured to:
   determine whether threshold number of lines are in a respective image of the first image and the second image;
   in response to the determination that the threshold number of lines are not in the respective image, detect and combine adjacent lines that run a same direction.

15. The system of claim 14, wherein the computing device is further configured to:
   identify whether a first segment of the plurality of fixed segments in the respective image is on or off;
   in response to determining that the identification of the first segment is uncertain, apply an edge classifier to the respective image.

16. The system of claim 13, wherein to decode the first encoded information screen and the second encoded information screen, the computing device is configured to:
   compute bits for error detection;
   determine whether an error exists in the respective image based on whether the computed bits for error detection match an expected bit sequence;
   in response to detecting that an error exists, prompt the user to retake the respective image.

* * * * *